(12) United States Patent
Jiang et al.

(10) Patent No.: US 12,735,197 B2
(45) Date of Patent: Sep. 15, 2026

(54) DIFFERENTIAL-SPEED TARGET PRECISE DOCKING AND RECOVERY SYSTEM

(71) Applicant: SHENYANG JIDONG TECHNOLOGY CO., LTD, Shenyang (CN)

(72) Inventors: Jun Jiang, Shenyang (CN); Xuezhu Wang, Shenyang (CN)

(73) Assignee: SHENYANG JIDONG TECHNOLOGY CO., LTD, Shenyang (CN)

( * ) Notice: Subject to any disclaimer, the term of this patent is extended or adjusted under 35 U.S.C. 154(b) by 0 days.

(21) Appl. No.: 19/256,784

(22) Filed: Jul. 1, 2025

(65) Prior Publication Data

US 2025/0326498 A1 Oct. 23, 2025

Related U.S. Application Data

(63) Continuation of application No. PCT/CN2023/142984, filed on Dec. 28, 2023, and a continuation of application No. PCT/CN2023/142975, filed on Dec. 28, 2023.

(30) Foreign Application Priority Data

Jan. 2, 2023 (CN) ......................... 202310000220.3
Jan. 2, 2023 (CN) ......................... 202310000226.0

(51) Int. Cl.
*B64F 1/02* (2006.01)

(52) U.S. Cl.
CPC .................................... *B64F 1/029* (2020.01)

(58) Field of Classification Search
CPC ......... B64F 1/029; B64F 1/0297; B64U 70/30
See application file for complete search history.

(56) References Cited

U.S. PATENT DOCUMENTS 7,219,856 B2 * 5/2007 Watts ........................ B64F 1/02 244/110 F
8,172,177 B2 * 5/2012 Lovell .................... B64U 70/30 244/110 F
2009/0294584 A1 * 12/2009 Lovell ..................... B63B 27/10 901/30

(Continued)

FOREIGN PATENT DOCUMENTS

CN 102040004 A 5/2011
CN 105438494 A 3/2016

(Continued)

OTHER PUBLICATIONS

International search report of PCT/CN2023/142975.
International search report of PCT/CN2023/142984.

*Primary Examiner* — Justin M Benedik

(57) ABSTRACT

A differential-speed target precise docking and recovery system includes a braking and guiding system, a guiding arm, a control system, and an impact load isolation means. The braking and guiding system is configured to reduce target energy and includes a braking device and a docking device that is connected to the braking device. The impact load isolation means releases or optimizes a force applied on a mechanical arm during the docking and braking process of a target, and transfers or transmits a load from the target imposed on the system to a buffering system.

20 Claims, 12 Drawing Sheets

(56) References Cited

U.S. PATENT DOCUMENTS

| | | | | |
|---|---|---|---|---|
| 2013/0082137 | A1* | 4/2013 | Gundlach | B64C 25/68 244/110 G |
| 2020/0156790 | A1 | 5/2020 | von Flotow et al. | |

FOREIGN PATENT DOCUMENTS

| | | | |
|---|---|---|---|
| CN | 106494631 | A | 3/2017 |
| CN | 106516144 | A | 3/2017 |
| CN | 106892129 | A | 6/2017 |
| CN | 107585322 | A | 1/2018 |
| CN | 107600445 | A | 1/2018 |
| CN | 107697303 | A | 2/2018 |
| CN | 107738750 | A | 2/2018 |
| CN | 108248864 | A | 7/2018 |
| CN | 110282146 | A | 9/2019 |
| CN | 111348212 | A | 6/2020 |
| CN | 111762332 | A | 10/2020 |
| CN | 112340045 | A | 2/2021 |
| CN | 112373711 | A | 2/2021 |
| CN | 113879537 | A | 1/2022 |
| CN | 114715424 | A | 7/2022 |
| CN | 115535250 | A | 12/2022 |

* cited by examiner

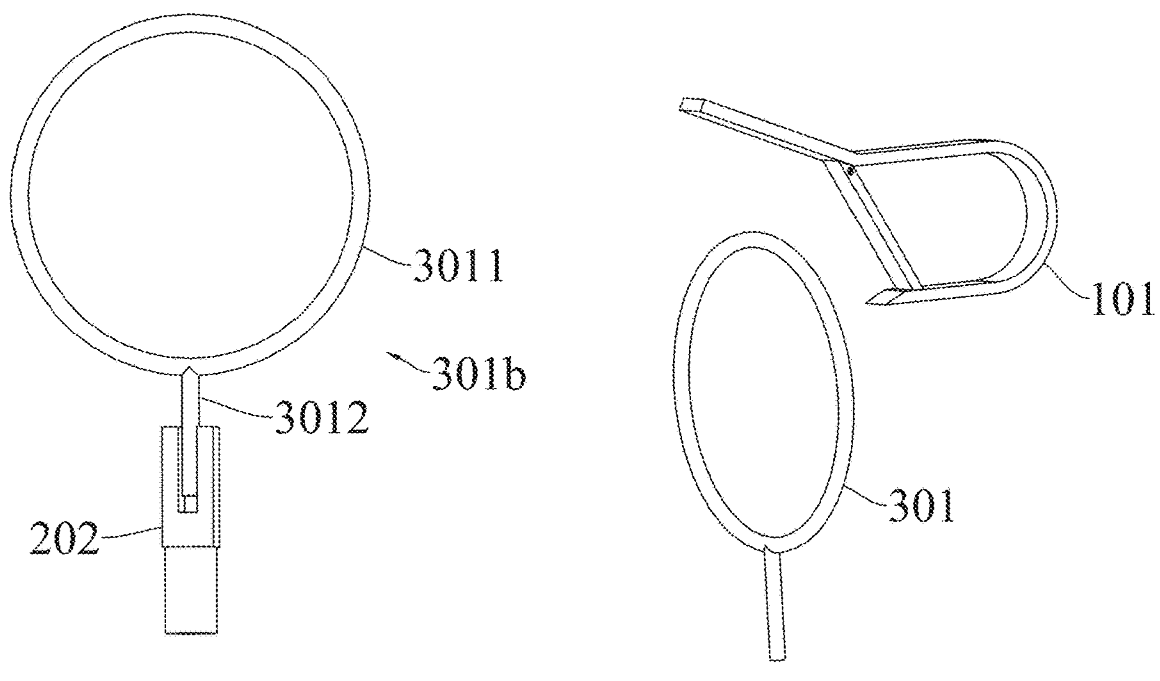
FIG. 2
FIG. 3
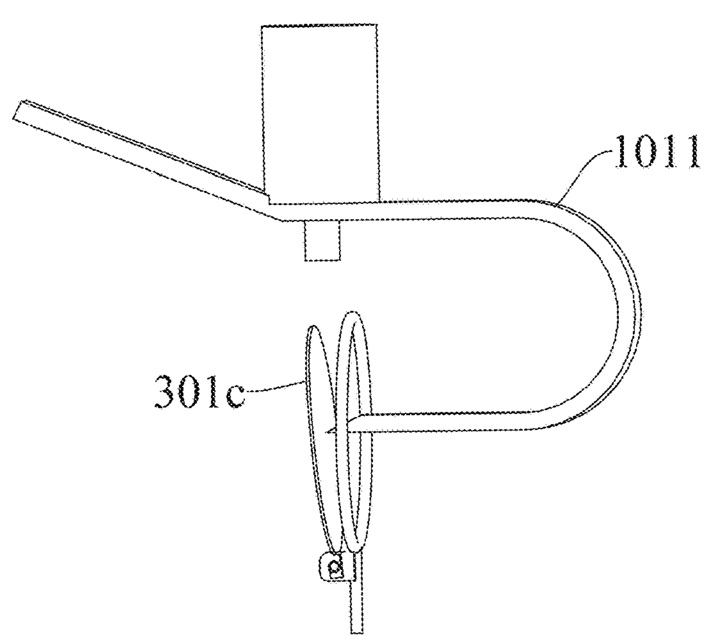
FIG. 4

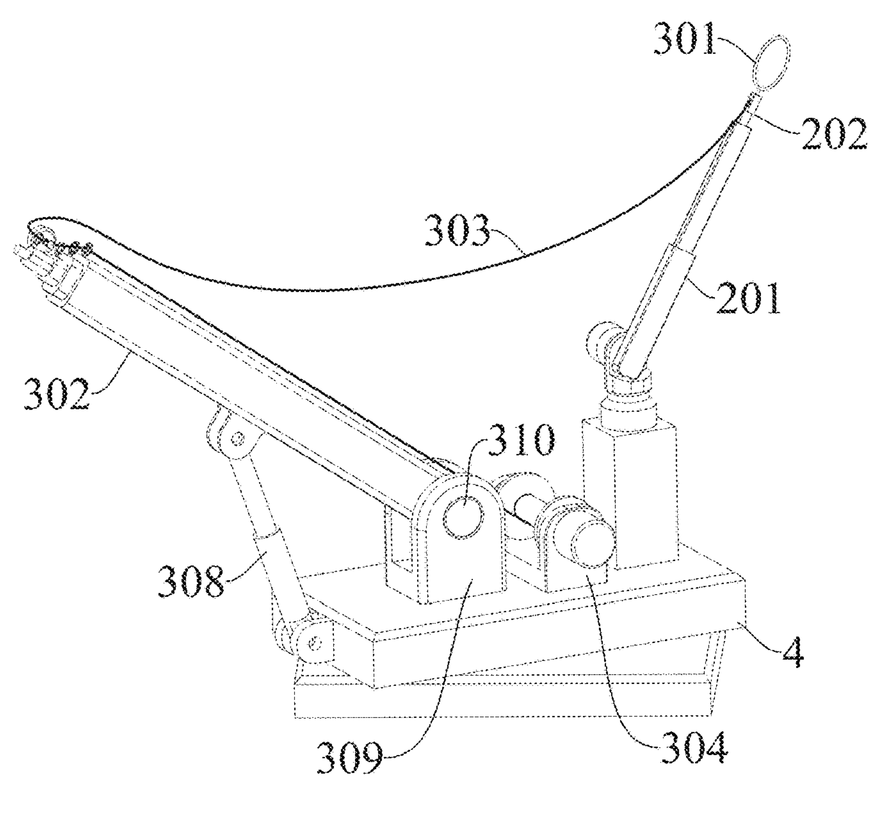
FIG. 5
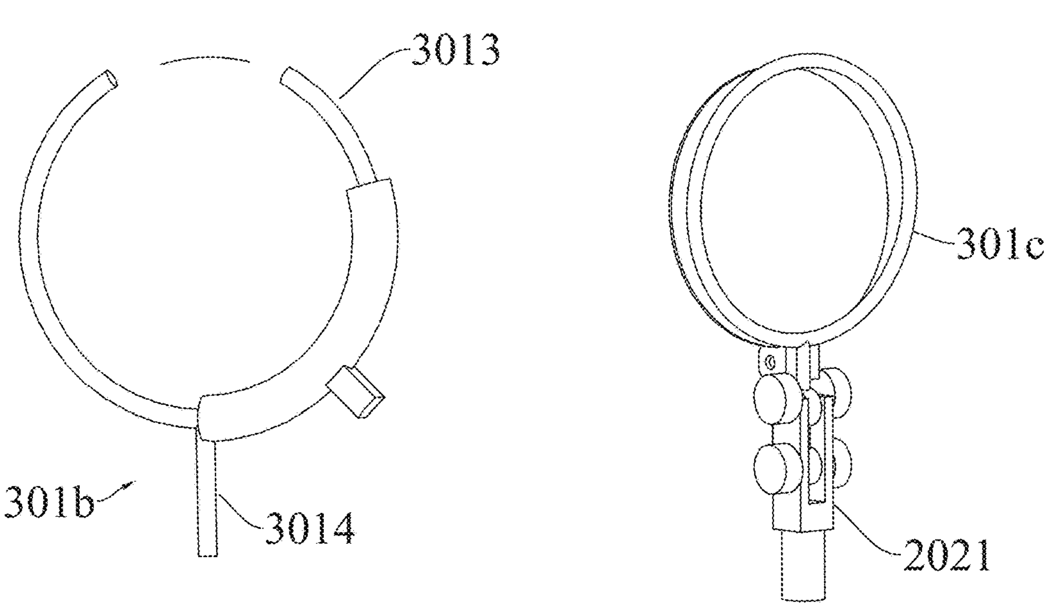
FIG. 6
FIG. 7

DIFFERENTIAL-SPEED TARGET PRECISE DOCKING AND RECOVERY SYSTEM

CROSS REFERENCE TO RELATED DISCLOSURES

The present application is a continuation-application of International (PCT) Patent Application No. PCT/CN2023/142984 filed on Dec. 28, 2023, which claims priority benefits to Chinese Patent Disclosure No. 2023100002203, filed on Jan. 2, 2023; and a continuation-application of International (PCT) Patent Application No. PCT/CN2023/142975 filed on Dec. 28, 2023, which claims priority benefits to Chinese Patent Disclosure No. 2023100002260, filed on Jan. 2, 2023; the contents of which are incorporated herein by reference.

TECHNICAL FIELD

The present disclosure belongs to the technical field of aircraft recovery, and specifically relates to a differential-speed target precise docking and recovery system.

BACKGROUND

A fixed-wing aircraft can be designed to offer advantages such as high speed, long endurance, and heavy payload capacity for specific task targets, thereby having wide applications. However, the fixed-wing aircraft needs a certain takeoff and landing speed, which makes landing difficult in uneven terrain, such as wilderness, forests, and urban environments. This problem seriously limits the application of the fixed-wing aircraft. In order to enable the fixed-wing aircraft to land successfully in complex ground environments, researchers and engineers in this field have naturally sought assisted landing and recovery methods, allowing the fixed-wing aircraft to land and be recovered in such scenarios.

In addition, differential docking and recovery in the air is also a highly challenging yet promising technology. For example, in an aircraft system with superior overall performance, formed by combining complementary-performance aircraft, a carrier aircraft often encounters difficulties in recovery a child aircraft due to significant differences in flight envelops. For example, in an aircraft system formed by combining a high-speed, long-endurance, and heavy-payload aircraft with a hovering-capable, compact, and short-endurance multirotor aircraft, the carrier aircraft will encounter difficulties in forming a formation flight at the same speed during child aircraft recovery. More specifically, similar challenges arise in combinations involving a large fixed-wing aircraft with a small fixed-wing aircraft or a large helicopter-type aircraft with a small fixed-wing aircraft. Especially for the fixed-wing aircraft and the small multirotor aircraft with significant size differences, their flight envelopes do no allow for stable flight at the same speed. In addition, for an aircraft that should maintain a certain speed, airborne differential docking and recovery makes it possible to land and load items.

Therefore, designing a reasonable differential docking and recovery system solution is a critical aspect in such applications.

SUMMARY

Embodiments of the present disclosure have high-precision and high-dynamic docking capabilities, allowing a docking component to be made significantly smaller. This avoids large-size and large-tolerance systems frequently seen in the prior art. Due to the separation design of docking and braking in the present disclosure, the volume and weight of a high-precision and high-value mechanical arm are minimized. Since the subsequent braking process primarily involves tensile forces, the internal stress distribution across the system components is more rational, allowing for a lighter structural design of each component.

A first aspect of the present disclosure provides a differential-speed target precise docking and recovery system, including: a braking and guiding system, configured to reduce target energy and including a braking device and a docking device connected to the braking device; a docking arm, configured to drive the docking device to dock with a target;

- a control system, configured to acquire state/states information of the docking arm and the target and to control the operation of the docking arm; and an impact load isolation means, configured to: release or optimize a force on the docking arm during the docking or braking process of the target, and transfer or transmit a load from the target imposed on the docking arm to the braking and guiding system.

A second aspect of the present disclosure provides a differential-speed target precise docking and recovery system, including: a braking device, configured to reduce target energy and provided with a docking device; a docking arm, configured to drive the docking device to dock with a target; and an impact load isolation means, configured to: enable the docking device to detach from the docking arm under impact when docking with the target, allowing a load from the target imposed on the docking arm to be transferred to the braking device.

BRIEF DESCRIPTION OF THE DRAWINGS

FIG. 2 is a perspective view of a docking device according to one aspect of the present disclosure.

FIG. 3 is a perspective view of a double-end docking device according to one aspect of the present disclosure.

FIG. 4 is a perspective view of another double-end docking device according to one aspect of the present disclosure.

FIG. 5 is a perspective view of an RRP mechanical arm according to one aspect of the present disclosure.

FIG. 6 is a perspective view of another docking device according to one aspect of the present disclosure.

FIG. 7 is a perspective view of a magnetic connection between a retaining member and a docking device according to one aspect of the present disclosure.

Figure 1:
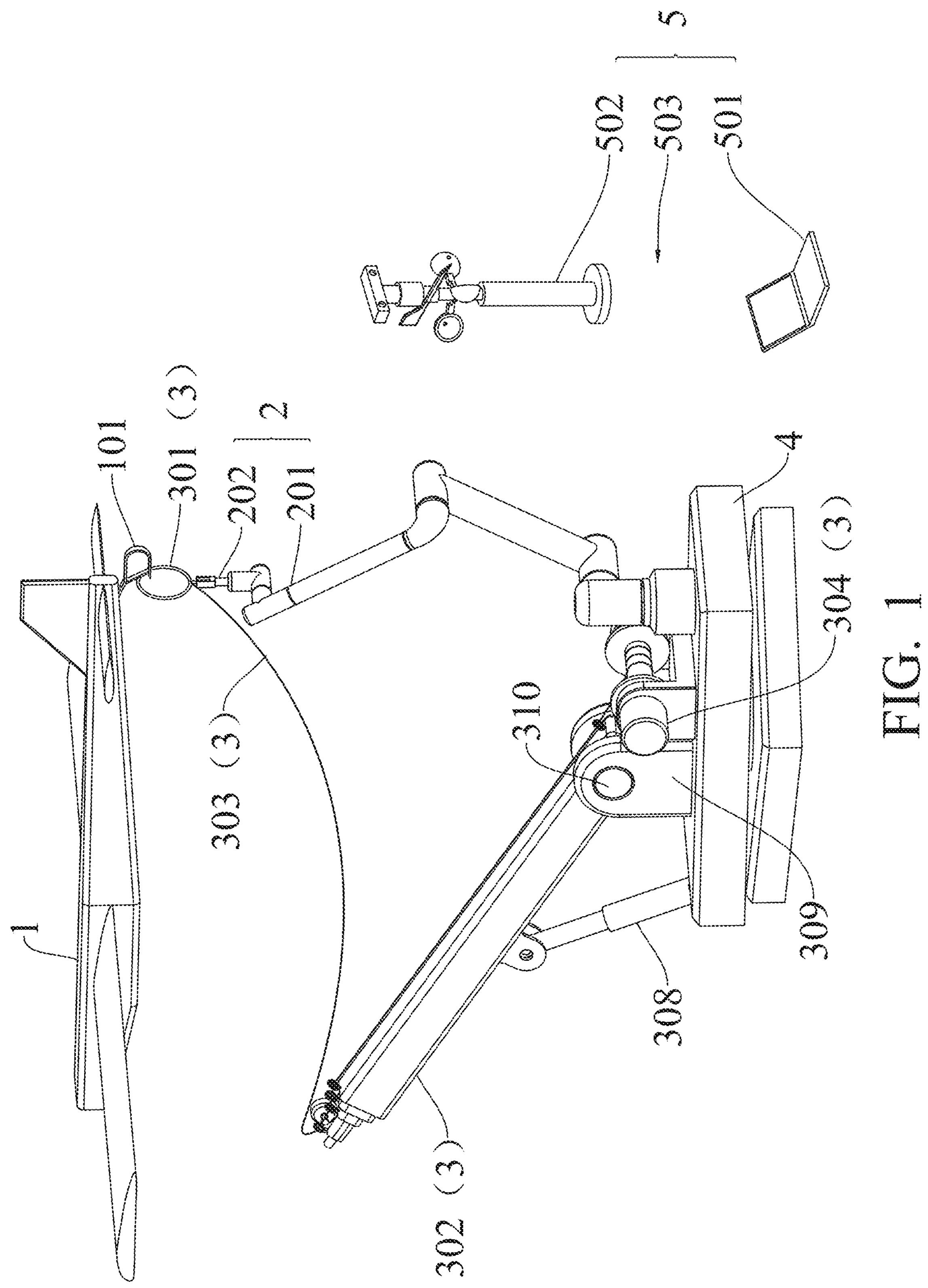
FIG. 1 is a perspective view of Embodiment 1.1 according to one aspect of the present disclosure.

Reference characters: 1—aircraft; 101, 1011—aircraft-side docking device; 2—high-dynamic precise docking subsystem; 201, 2011, 2012, 2013—mechanical arm; 202—U-shaped clamp; 203—torque-limiting coupling; 204—clutch; 3—guiding and braking subsystem; 301, **301*a*, 301*b*—docking device; 3011, 3013—coupling portion; 3012, 3014—rod body; 302, 3021—guiding rod; 303, 3031—guiding cable; 304—winch; 305—first limiting block; 306—second limiting block; 307—guide ring; 308—limiter; 308*a*—angle adjustment device; 309—revolute joint; 310—rotating mechanism; 311—propeller; 312—cable adjuster; 3121—motor; 3122—cable shaft; 313—locking device; 314—trolley; 315—rail; 316—mounting rack; 318—mobile device; 3181—guide rail; 3182—slide seat; 319—telescopic drive mechanism; 4—base; 5—sensing control system; 501—control system; 502—environmental sensing subsystem; 503—status sensing subsystem; 6—storage subsystem; 601—storage cabin; 7, 7*a*, 7*b*—cargo; 701—cargo-side docking device; 8, 8*a*—clamping device; and 9**—carrier aircraft.

DETAILED DESCRIPTION OF THE EMBODIMENTS

The present disclosure is further explained below with reference to specific embodiments, but the present disclosure is not limited thereto. The structure, proportion, size, and the like illustrated in the accompanying drawings in this specification are only used to support the content disclosed in this specification, to facilitate understanding and reading by those skilled in the art, but are not intended to limit the implementation conditions of the present disclosure, and therefore, do not have substantial technical significance. Any structural modifications, proportional relationship adjustments, or size changes shall fall within the scope of technical content disclosed in the present disclosure without affecting effects and objectives that can be achieved by the present disclosure. In addition, the terms such as "upper," "lower," "front," "rear," and "middle" cited in the specification are only used for ease of description, but are not used to limit the implementation scope of the present disclosure. Changes or adjustments in relative relationships without changing the essence of technical content shall be considered to fall within the implementation scope of the present disclosure.

Currently, the methods for assisted landing of a fixed-wing aircraft on a platform mainly include: net recovery, cable recovery, and a combination thereof.

Patent CN112373711A employs a typical net recovery method. Since a recovery net has a large surface area, the system has a large tolerance, resulting in a high recovery success rate. However, the drawbacks of net recovery are also evident. The recovery net often occupies a large space, and in order to meet the basic strength requirements for the system, the system structure tends to be heavy, which compromises its portability. In addition, after being arrested by the net, the aircraft tends to come to rest at a random location within a wide area, making subsequent automated storage operations difficult. In practice, this step is often performed manually. Patent CN114715424A utilizes a large hanging mechanism to hang the recovery net in the air, optimizing space utilization. However, the trade-off is that the system becomes extremely bulky and heavy. Patents CN112340045A, CN105438494A, CN102040004A, and CN106494631A also fall under this category of net recovery.

Cable recovery can be divided into two categories: the first category involves wing-cable recovery, where the wing-tip hooks and locks the cable; and the second category involves belly/tail hook locking for the aircraft.

Application CN110282146A is a typical method of belly-hook cable recovery. Similar to net recovery, this method offers the advantage of a large recovery tolerance, which contributes to better recovery reliability. However, unlike net recovery, which provides tolerance in two dimensions, cable recovery offers a large tolerance only in one dimension, while alignment in the other degree of freedom has to rely on the control capabilities of the aircraft. Since the self-control accuracy of the aircraft is limited, the theoretical reliability of this method is slightly lower than that of net recovery. Since the weight of a recovery cable is generally lighter than that of a recovery net, the overall weight of a cable recovery system is typically slightly lighter than that of a net recovery system. However, due to the large overall size, and the need to maintain the basic strength of the system, the cable recovery system is also large and heavy. Patent CN111348212A improves upon traditional cable recovery by using an actively moving recovery cable, enhancing performance to some extent. Nevertheless, it still struggles to overcome the drawbacks of large size and heavy weight of the cable recovery system. Patent CN107600445A utilizes a large hanging mechanism to hang the recovery cable in the air, reducing the occupation of ground space. However, the trade-off is that the system is extremely bulky and heavy.

Another category of cable recovery arranges a recovery cable vertically and places a hook at the wingtip of the aircraft. When the wing strikes the vertical recovery cable, the recovery cable naturally slides toward the wingtip and is then locked by the wingtip hook. Patent CN111762332A is a typical representative example of this design. The advantages of this recovery method are similar to those of the aforesaid recovery method. However, its drawbacks are also larger the same. In addition to large size and heavy weight of the system, cable recovery also faces challenges in subsequent automated recovery.

Current recovery methods often suffer from drawbacks such as large system size, heavy weight, poor portability, long deployment time, and low automation degree. The root causes of these problems lie in that: 1) without a dedicated motion state compensation device, an imprecise docking method of aircraft self-control accuracy and large-tolerance docking is adopted, which makes the recovery system have to compensate for recovery success rate by operating in a large space .poor, resulting in bulky and heavy system; 2) the recovery system lacks functional separation, resulting in a large-tolerance recovery device independently performing both the "docking" and subsequent "braking" tasks for the aircraft and the system. The position and attitude of the aircraft after stopping are completely uncertain, which complicates subsequent "storage" operations and makes automation difficult or automated storage costly. This design also makes it difficult to upgrade the system using a highly automated mechanical arm. Typically, the load capacity of a mechanical arm is determined by the drive's carrying capacity. As a precision equipment, the cost, size, and weight of a mechanical arm increase sharply with its load capacity. Since the recovered aircraft should maintain a certain speed and cannot decelerate to 0, direct capture by a mechanical arm certainly requires an extremely large load capacity, leading to an oversized and overweight system with uncontrollable costs.

With the methods mentioned above, the bulky and heavy-weight system is often difficult to transport, arrange and deploy, and suffers from poor portability. This seriously limits the application scenarios and recovery efficiency of the fixed-wing aircraft. Moreover, since these methods require manual operation, they are not aligned with the growing need for fully automated recovery of the fixed-wing aircraft.

The present disclosure provides a differential-speed target precise docking and recovery system. The goal of the present disclosure is to enable a ground base station to dock with and transfer an airborne moving target. The target refers to an aircraft, items carried by the aircraft, or both. These items may include, but are not limited to, cargo, fuel, batteries, and the like. The system can be applied to regional aerial reconnaissance, where the base station is equipped with this docking system and deploys a plurality of child aircraft for reconnaissance. Once a reconnaissance task is issued, the base station releases and recycles the child aircraft through this docking system. The system can also be applied in aerial logistics, where the ground base station deploys this docking system to transfer the cargo carried by the aircraft to the base station, or transfer the cargo from the base station to the aircraft. The system can transfer the cargo only or both the aircraft and the cargo.

Due to high flight speed of the fixed-wing aircraft, the prior art usually employs arresting cables/ropes or arresting nets for recovery. Their technical shortcomings have been thoroughly discussed in the background section of the present disclosure and will not be repeated here. To address these problems, the present disclosure proposes a load isolation recovery solution based on a high-dynamic, high-precision, and lightweight mechanical arm for accurate docking and specially designed to handle impact loads during the recovery process. Compared with the recovery methods in the prior art, the present disclosure utilizes the mechanical arm to compensate for the motion state difference between the aircraft and the recovery system, eliminating the need for a large-tolerance device and necessary safety distance/space required when replying on the motion of the aircraft, as well as addressing the problems of excessive system size and heavy weight. The docking structure in the present disclosure is significantly reduced in size compared to those in existing recovery methods. For the mechanical arm, its load-carrying capacity primarily depends on the carrying capacity of the servo drive, which also heavily influence the overall weight and cost. The impact load isolation solution proposed in the present disclosure effectively reduces the demands on the servo drive capability of the mechanical arm, thereby reducing the system cost. Since the impact load from the aircraft flight is handled by a dedicated guiding and braking subsystem, the motion trajectory of the aircraft during braking can be optimized according to the specific application scenario, improving the utilization of spatial resources. Additionally, the use of the dedicated braking force design can effectively shorten the braking distance, enabling the overall system to be highly compact.

The present disclosure includes the following subsystems: a high-dynamic precise docking subsystem, a guiding and braking subsystem, and a sensing control system.

One of the core concepts of the present disclosure is to achieve high-precision dynamic docking with an aircraft in flight. To achieve precise docking under the high-dynamic conditions induced by the aircraft, equipment having both high dynamics and high precision is required. As of the prior art, the equipment capable of achieving this goal is a mechanical arm.

The high-dynamic precise docking subsystem is primarily composed of the mechanical arm. The function of the high-dynamic precise docking subsystem is to use the high-dynamic, high-precision motion capability of the mechanical arm to drive a miniature docking device to dock and lock with the aircraft rapidly at the exact moment when the aircraft passes by the recovery system. Since the mechanical arm is high-value precision equipment, its load capacity mainly depends on the high-value servo drive system and precision transmission system. Therefore, it is critical important to control the size and weight of the mechanical arm and to protect the servo drive system. Since the weight of the docking device is extremely light compared to the aircraft itself, typically only a few hundredths, a few thousandths, or even smaller, the mechanical arm in the present disclosure can be made significantly lighter than a recovery system that directly bears the aircraft. Consequently, the weight and cost of the system can be minimized. Moreover, a lightweight structure of the mechanical arm facilitates high-dynamic and high-precision control, making it suitable for dynamic and precise docking with fast-moving objects such as the fixed-wing aircraft.

One of the core concepts of the present disclosure is that the high-dynamic precise docking system only bears the lightweight docking device rather than a load caused by the kinetic energy of the aircraft. Therefore, an isolation design is required to mitigate the impact transferred to the system after docking with the aircraft. This ensures that the lightweight and compact mechanical arm can meet the high-dynamic precise docking requirements while protecting the precise and costly servo drive and precision transmission systems from damage due to impact. This is generally achieved through an impact load isolation means, which has the functions of:

1. Maintaining a fixed connection between the docking device and the mechanical arm before the docking device docks with the aircraft, ensuring: (1) the docking device can follow the mechanical arm to achieve high-dynamic and high-precision motion; and (2) the docking device achieves reliable docking and locking with the aircraft's docking device.
2. Disengaging or isolating the force transmission between the docking device and the mechanical arm's servo drive or the mechanical arm after the aircraft docks with the docking device, thereby protecting the mechanical arm's servo drive or the entire mechanical arm.

A first design of the impact load isolation means involves a retaining member directly connected to the docking device and mounted at a free end of the mechanical arm. This type of impact load isolation means can allow the docking device to be driven by the mechanical arm to achieve high-dynamic and high-precision motion before being impacted by the aircraft. Upon impact from the aircraft's docking device, it ensures a reliable docking between the aircraft's docking device and the mechanical arm's docking device. Since the maximum allowable force between the impact load isolation means and the docking device is designed to be smaller than the maximum allowable load of the mechanical arm, the docking device is driven to continue moving without any damage to the mechanical arm after the aircraft imposes impact and is locked with the docking device. This retaining device can be implemented through various principles, including, but not limited to: a mechanical engagement member with a clamping function and certain friction, permanent magnetic attraction, electromagnetic means, a controllable electromechanical device, and a disposable breakable device. Therefore, the aircraft will carry the docking device to detach from the mechanical arm, thereby preventing a large impact load from being fully applied onto the mechanical arm. An end of the docking device is connected to a guiding device through a cable, so when the aircraft carries the docking device to detach from the mechanical arm, the docking device will transfer the motion of the aircraft and the load from the aircraft to the downstream guiding device and the brake.

A second design of the impact load isolation means involves arranging a load isolation device between the servo drive and the lever of the mechanical arm to achieve torque transmission and release between them. The torque release can be either complete or controllable based on the applicability of the design solution. The load isolation device uses torque-limiting device or a controllable physical isolation device between a drive and a revolute joint. The torque-limiting device is designed to: (1) ensure sufficient torque to give the lever of the mechanical arm enough dynamic motion capability, thereby driving the docking device for high-dynamic docking with the aircraft and to lock the aircraft's docking device; (2) allow the mechanical arm to be pulled by the aircraft after the docking device locks the aircraft, so that the resulting impact load exceeds a set value of the load isolation device and thus is isolated from the mechanical arm's drive. For example, a friction torque limiter or a ball-type torque limiter can be used. After the docking device locks the aircraft, the mechanical arm can enter a passive working state. This passive working state is manifested in that: (1) if the mechanical arm is subjected only to a pull force, it functions like a cable, utilizing its structural strength and material properties to bear a load from subsequent impact; and (2) if a limiting device is employed to restrict the rotating motion of the mechanical arm, the mechanical arm should bear both a pull force and a bending moment, with the load of the bending moment primarily borne by the structure of the mechanical arm. In either case, neither the servo drive nor the transmission mechanism bears any load from impact.

In the guiding and braking subsystem, the docking device has the function of achieving precise docking and locking with the aircraft's docking device rapidly under the drive of the mechanical arm at the exact moment when the aircraft passes by the recovery system. As a member directly connected to the aircraft, it constrains the aircraft's motion trajectory under the constraint of a guiding device and transmits the braking force from the braking device to the aircraft during the aircraft braking process. Due to the high-dynamic and high-precision motion capability of the mechanical arm, the docking device can be miniaturized to compensate for minor relative positional deviation between the mechanical arm's docking device and the target's docking device, thereby reducing the demand for the size of the mechanical arm by orders of magnitude.

For the first design of the impact load isolation means, the docking device, mounted at the free end of a mechanical arm, moves with the free end of the mechanical arm. When a fixed-wing aircraft to be recovered passes by, the docking device, driven by the mechanical arm, docks and locks with the aircraft's docking device. Under the effect of inertia, the aircraft continues moving forward. Since the docking devices on both ends have been locked, the aircraft drives the recovery system's docking device to detach from the mechanical arm, thereby preventing damage to the mechanical structure or burnout of the servo drive of the mechanical arm due to overload. The docking device is provided with a cable, and the other end of the cable is connected to the guiding device. The cable transfers an impact load from the aircraft.

In an example of the second design of the impact load isolation means, the fixed end of the mechanical arm is fixedly connected to a moving end of the guiding device, which may be a telescopic rod or a movable carrier (e.g., a trolley, an air-cushion vehicle, or a vessel). The fixed end of the mechanical arm is fixedly connected to an end of the telescopic rod or a sliding trolley. The docking device is fixedly connected to the free end of the mechanical arm. When the aircraft drives the docking device to move, the mechanical arm enters a passive working state. As a result, only the lever of the mechanical arm is subjected to a pull force, while the drive remains unloaded. Ideally, the mechanical arm, with its revolute joint no longer subjected to any force, forms a "two-force rod" and is subjected to the pull force only. Since the strength of the lever subjected to the pull force primarily depends on structural design and material strength, and the material strength in a conventional mechanical arm is typically orders of magnitude higher than the maximum driving capacity of the driver, and thus, the load is objectively isolated.

In another example of the second design of the impact load isolation means, a telescopic guiding device is fixedly connected to the last section of a mechanical arm, and the docking device is fixedly mounted at an end of the guiding device. When a fixed-wing aircraft to be recovered passes by, the docking device, driven by the mechanical arm, docks and locks with the aircraft's docking device. Under the effect of inertia, the aircraft continues moving forward and drives the mechanical arm into a limited state. The free end of the mechanical arm is pulled by the aircraft, while the root of the mechanical arm experiences a tensile force from the base and maintains a constant relative position with respect to the base. The lever of the mechanical arm is constrained by a limiter, and its angular position no longer changes, putting the mechanical arm in a limited state and causing the lever to experience a certain bending moment. However, none of these forces are transferred to the servo drive of the mechanical arm. The force/torque from the impact load of the aircraft is transmitted through the mechanical arm and a mechanical limiting device to the base, thereby preventing burnout of the servo drive of the mechanical arm due to overload. This design is also applicable when the guiding device is composed of a mobile carrier and a telescopic rod, such as a rail-guided trolley. After the mechanical arm docks with the aircraft, the aircraft drives the mechanical arm into a limited state and further drives the trolley to move. The servo drive and the transmission mechanism of the mechanical arm are isolated from the force applied by the load.

The guiding device has the function of constraining the motion trajectory of the aircraft after docking to meet the specific requirements for its motion path in an environment where the system is located. The guiding device also has the function of providing specific constraints for the aircraft to keep it in a defined motion state during the recovery process once it has stopped, so as to facilitate subsequent recovery and storage, particularly automated recovery and storage. In some designs, the guiding device may also incorporate a resistance design or rely on a motion trajectory design to provide a braking force for the aircraft.

The motion trajectory provided by the guiding device constrains the motion of the aircraft and can be achieved in the following ways: specific deformations, such as extension/retraction of a telescopic rod; specific rails, such as a trolley's guide rail; controllable mobile carriers, such as a direction-controllable mobile platform; traceable trajectories induced by specific forces, such as a circular arc at an end of a rotating body or an "involute" of a variable-radius rotating body.

During the braking stage, a power source that drives the guiding device to achieve specific motion often comes from the aircraft after docking. In some special application designs, the motion of the guiding device in this stage may also partially come from specific drive equipment. After the docking device docks with the aircraft, the docking device will apply a force on the guiding device under the traction of the aircraft due to the connection between the docking device and the moving end of the guiding device, thereby triggering a specific motion or deformation of the guiding device or both. After the aircraft brakes, the guiding device may recycle the aircraft to a specific position under the drive of a specially designed drive device or by reusing other parts of the drive device. In some requirements, such as fully automated recovery and storage, a mechanism may be specifically designed to ensure that the aircraft is recovered to a precise motion state, such as specific position and attitude.

The brake in the present disclosure may be a dedicated braking apparatus or a braking capability attached to some structures or devices. It may be physical equipment or play a functional role. Its purpose is to provide a braking force for the braking process of an aircraft. When necessary, the braking force can be adjusted in real time to optimize the braking process. In some designs, it can be reused as a driving force needed for recovery the aircraft during the recovery process after the aircraft has stopped.

The braking force of the brake can be achieved in various ways or combinations thereof. During the motion and deformation process of the guiding device, the braking device is driven to consume the kinetic energy of the aircraft. Implementation approaches include, but are not limited to: a cable-towing rotary energy dissipater; friction between relative moving components of the guiding device; an aerodynamic device (including a drag parachute) mounted on the guiding device; reverse thrust from the aircraft itself; adjustment of air inflow on a cavity volume-variable guiding device; and a reduction in the kinetic energy of the aircraft induced by some special paths of the guiding device.

Specifically, for Embodiment 1.1, refer to FIG. 1.

In the present embodiment, a high-dynamic precise docking subsystem 2 includes a 6-degree-of-freedom mechanical arm 201 and a U-shaped clamp 202 as a retaining member. A fixed end of the mechanical arm 201 is fixed on a base 4, and the U-shaped clamp 202 is mounted at a free end of the mechanical arm 201. The opening direction of the U-shaped clamp 202 is the same as a flight direction of an aircraft 1 recovered. A guiding and braking subsystem 3 includes an annular docking device 301, a guiding device, a guiding cable 303, and a winch 304 with a braking function, where the guiding device fixedly mounted on the base 4. In the present embodiment, the guiding device employs a multi-stage telescopic guiding rod 302. In the present embodiment, a docking device 301*a* includes a coupling portion 3011, where a rod body 3012 is arranged on the coupling portion 3011. The retaining member is implemented with the U-shaped clamp 202, as shown in FIG. 2. The rod body 3012 is configured to connect to the U-shaped clamp 202, and the docking device 301*a* is held in place on the U-shaped clamp 202 through friction, maintaining a constant relative position during the motion process of the mechanical arm 201. The coupling portion 3011 is a closed ring, sized to correspond to the control precision of the relative state between the mechanical arm 201 and the aircraft 1. An aircraft-side docking device 101 engages with the docking device 301 of the recovery system. In some embodiments, the aircraft-side docking device 101 is implemented using a hook with a locking function. For example, the aircraft-side docking device 101 employs a self-locking hook with a self-locking function, as shown in FIG. 3. Alternatively, the aircraft-side docking device 101 employs an electromagnetic hook with an electromagnetic locking function, as shown in FIG. 4. When the aircraft-side docking device 101 collides with the coupling portion, the two are engaged and locked. Meanwhile, since the maximum friction between the rod body 3012 of the docking device 301*a* and the U-shaped clamp 202 is sufficiently low, the aircraft 1 drives the docking device 301*a* to detach from the U-shaped clamp 202. One end of the guiding cable 303 is connected to the winch 304, and the other end passes through a guiding element disposed at the end of the last section of the guiding rod 302 and then connects to the docking device 301*a*. The connection between the rod body 3012 of the docking device 301*a* and the U-shaped clamp 202 is maintained and separated through specific friction between them, achieving load isolation. The load isolation design needs to satisfy the following conditions: a retention force between the U-shaped clamp 202 and the docking device 301*a* meets the requirements for high-dynamic motion, while also providing a force necessary for reliable docking between the docking device 301*a* and the aircraft-side docking device 101. A load imposed on the mechanical arm 201 caused by the maximum retention force between the U-shaped clamp 202 and the docking device 301*a* is smaller than the carrying capacity of the servo drive device of the mechanical arm 201. Therefore, the minimum friction can enable the docking device 301*a* to follow the high-dynamic motion of the mechanical arm 201, thereby compensating for the state difference between the aircraft 1 and the base 4, and ensuring reliable docking between the docking device 301*a* and the aircraft. The maximum friction is designed to ensure that the docking device 301*a* can detach from the U-shaped clamp 202 without overloading the mechanical arm 201. Once the aircraft 1 flies over the reachable range of the mechanical arm 201, the mechanical arm 201 guides the docking device 301*a* to dock and lock with the aircraft-side docking device 101 rapidly. Under the impact from the aircraft 1, the docking device 301*a* detaches from the U-shaped clamp 202. Since the maximum friction between the U-shaped clamp 202 and the docking device 301*a* is smaller than the load capacity of the mechanical arm 201, no damage to the mechanical arm 201 is caused in this process. The load from the aircraft 1 is directly transferred from the mechanical arm 201 to the guiding rod 302, further fully achieving load isolation.

In the present embodiment, load isolation is achieved through the aforementioned method. The mechanical arm 201 only needs to bear the weight of the docking device 301*a* and the limited impact force required for detaching the docking device 301*a* from the U-shaped clamp 202. Therefore, the mechanical arm 201 can maintain the same dynamic motion capability while remaining compact in structure, lightweight and cost-effective.

The mechanical arm 201 can be flexibly configured with the degrees of freedom and structural forms according to task requirements. Typically, at least 2 positional degrees of freedom are needed to enable the docking device 301 to better dock with the aircraft 1. A commonly used configuration is an RRP-type 3-DOF mechanical arm shown in FIG. 5.

In some embodiments, the coupling portion 3013 of the docking device 301*b* can be designed to enable controllable opening and closing, as shown in FIG. 6, so as to facilitate disengagement from the recovered target during the subsequent recovery process. In some embodiments, the docking device 301*c* and the retaining member 2021 may also be magnetically connected, as shown in FIG. 7. For example, the docking device 301*c* can be maintained on the retaining member 2021 through a permanent magnet, where the magnetic force is designed similarly to the friction mentioned above. Alternatively, an electromagnetic method may be adopted and achieved in the same way as permanent magnet. The electromagnetic force can be controlled by triggering a switch during the action process, allowing for connection and disconnection between the retaining member 2021 and the docking device 301*c*. Control methods of the electromagnetic force include, but are not limited to: a mechanical switch (typically a micro switch), a photoelectric switch, machine vision judgment, and the like.

Figure 8:
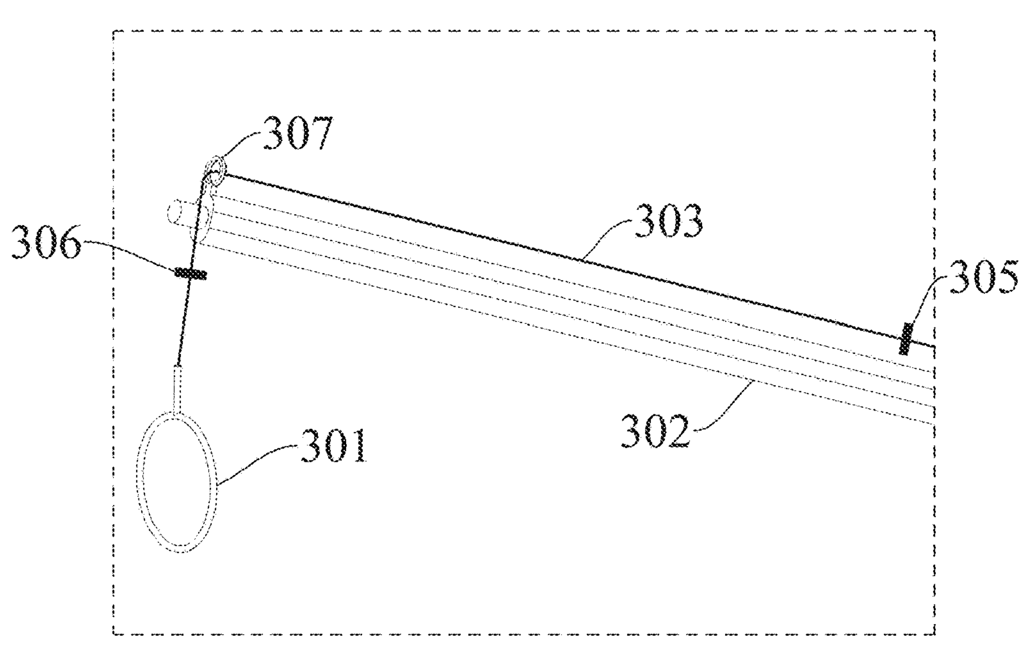
FIG. 8 is a perspective view of a limiting block for a guiding cable according to one aspect of the present disclosure.

In some embodiments, as shown in FIG. 8, the guiding cable 303 is equipped with a first limiting block 305 and a second limiting block 306, the first limiting block 305 and the second limiting block 306 being disposed at both sides of a guiding element on an end of a guiding rod along the extension direction of the guiding cable 303. In the present embodiment, the guiding element is implemented as a guide ring 307 of an annular structure. When the docking device 301 moves with the aircraft 1, the guiding cable 303 is pulled, and the first limiting block 305 moves to the guide ring 307 and is pressed against the guide ring. The guiding cable 303 is pulled tight to further drive the guiding rod 302 to progressively extend. During the extension process, the guiding rod 302 provides a path guidance for the aircraft 1, thereby controlling the path and overall trajectory of the aircraft 1. As the guiding rod 302 is progressively extended, its force on the aircraft 1 changes little during the whole process, thereby preventing the aircraft 1 from experiencing excessive instantaneous impact.

In some embodiments, the guiding cable 303 passes through the guide ring 307 disposed at an end of each stage of the guiding rod 302 and then connects to the docking device 301. Alternatively, in some examples, the function of the guiding element mentioned above can be implemented within the guiding rod 302, where the guiding cable 303 passes through the interior of the guiding rod 302 and exits from a through hole formed in an end of the guiding rod 302. The through hole serves as an implementation of the guiding element. In addition, in some embodiments, the guiding cable 303 includes a first guiding cable and a second guiding cable. The first guiding cable connects the docking device 301 to an end of the guiding rod 302, and the second guiding cable connects the winch 304 to an end of the guiding rod 302. Definitely, in the absence of the winch 304, only the first guiding cable is retained.

Typically, depending on practical applications, the guiding rod 302 is preset with a pitch angle. In order to enable the guiding rod 302 to adapt to various application environments, in some embodiments, the guiding rod 302 is further equipped with a limiter 308. By adjusting the limiter 308, the guiding slope of the guiding rod 302 can be set to an optimal value. Typically, the limiter 308 restricts the guiding path of the guiding rod 302 to an upward slope, so as to leverage this upward slope to convert part of the kinetic energy of the aircraft 1 into potential energy, thereby optimizing the utilization of the guiding rod 302. In some embodiments, the limiter 308 can be designed to be adjustable in real time, such as a controllable telescopic rod, so that the forces on the guiding rod 302 can be reasonably adjusted based on different states of the aircraft 1. In addition, keeping the guiding rod 302 on the upward slope also avoids interference with other equipment, making better use of the available the space. Furthermore, in some embodiments, the pitch angle may be adjusted through a rotating mechanism 310 disposed on a revolute joint 309 of the guiding rod 302.

As the aircraft 1 drives the guiding rod 302 to extend, the force acting on the aircraft 1 is adjusted by controlling the torque of the winch 304 to achieve a better braking effect. For example, by controlling the winch 304, the pull force on the aircraft 1 can be kept within its maximum tolerable limit, enabling the aircraft to brake in the shortest distance and time. In this way, the size and weight of the system can be minimized. In addition to the function of adjusting the braking effect, the winch 304 can also recycle the guiding cable 303 after the aircraft 1 has stopped moving. During the recovery process of the guiding cable 303, the second limiting block 306 moves to the guide ring 307 and is pressed against it, and the guiding cable 303 continues recovery, driving the guiding rod 302 to contract progressively, while also pulling the aircraft 1 back to facilitate subsequent recovery operations. In some embodiments, the guiding cable 303 may only be equipped with the first limiting block 305, while the limiting function of the second limiting block 306 is achieved by the docking device 301.

In some embodiments, brake components may be disposed between various sections of the guiding rod 302 to achieve the participation of the guiding rod in the braking process. For example, friction pieces are disposed between rods to achieve braking during guidance of the rods through friction. Additionally, regulators for adjusting normal pressure on the friction pieces may be installed to achieve controllable friction.

In some embodiments, the pull force applied by the guiding rod 302 on the aircraft 1 can be adjusted through aero-hydrodynamics by controlling air inflow during the extension process of the guiding rod 302. This is typically achieved by forming a hole in an end of the guiding rod 302 and installing a controllable air valve. Furthermore, in some embodiments, the guiding rod 302 can be given the ability to autonomously extend and retract by pressurizing air into and extracting air from it. This can assist the winch 304 mentioned in the solutions above to jointly brake and recycle the aircraft 1. Alternatively, the winch 304 may be removed, with the guidance, braking, recovery and other tasks of the aircraft 1 being completed independently.

In some embodiments, aerodynamic devices such as a propeller may be installed on the guiding rod 302. During the extension process of the guiding rod 302, the braking force applied to the aircraft 1 can be adjusted by controlling the pull force of these aerodynamic devices.

Figure 9:
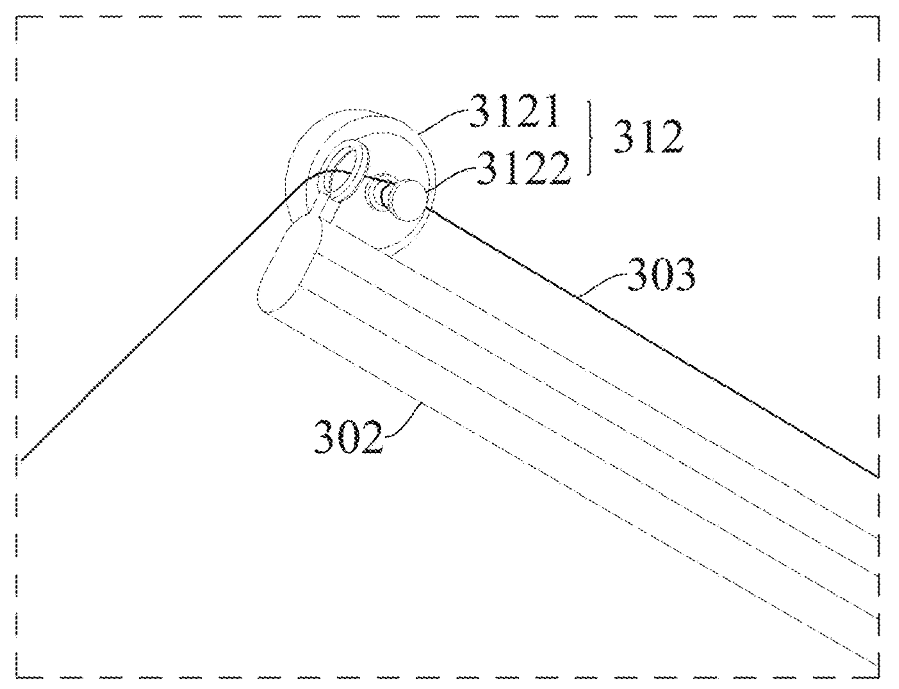
FIG. 9 is a perspective view of a cable adjuster according to one aspect of the present disclosure.

In some embodiments, when the aircraft 1 is braked and suspended at one end of the guiding rod 302, in order to better adjust the height of the aircraft 1 above the ground or the distance between the aircraft 1 and the end of the guiding rod 302, with reference to FIG. 9, a cable adjuster 312 is provided at the last section of the guiding rod 302. The cable adjuster 312 controls the retraction and release of the guiding cable 303, thereby adjusting the length of the guiding cable 03 at the end of the guiding rod 302. The cable adjuster 312 includes a motor 3121. An output end of the motor 3121 is equipped with a cable shaft 3122 for winding the cable. After extracted from the winch 304, the guiding cable 303 through a guiding element along the guiding rod 302, winds around the cable shaft 3122, and then connects to the docking device 301.

In the present disclosure, the guiding rod 302 is an abstract representation of a telescopic mechanism along certain linear degrees of freedom, including, but not limited to, a multistage telescopic rod, a guide rail sliding block, a range extension mechanism, and other mechanisms capable of achieving this function, as well as combinations thereof.

The recovery system is equipped with a sensing control system 5, including a status sensing subsystem 503 and a control system 501.

The status sensing subsystem 503 is configured to acquire the state/states information of each unit of the recovery system described in the present disclosure, as well as the state/states information of the aircraft 1. The status sensing subsystem includes sensors disposed on various components of the recovery system and further includes a status observation device configured to monitor the aircraft. The status observation device is configured to measure the motion state of the aircraft, including position and attitude. The status observation device may be flexibly arranged at locations convenient for status observation, including, but not limited to: the mechanical arm, the base, an aircraft body, or any combinations of these locations. The status observation device may be equipment that directly acquires the relative state of an observed object. For example, optical measurement methods may be employed, typically using monocular, binocular, or multiocular camera imaging or vision thereof for recognition and measurement through machine vision. Alternatively, equipment for acquiring relative state based on radar, millimeter wave, ultrasonic positioning, satellite positioning, and the like may be employed. Alternatively, multi-sensor fusion status observation equipment combinations and algorithms integrating the aircraft's inertial sensor, combined navigation system, and the aforementioned positioning methods may be employed. In some embodiments, the aircraft 1 is provided with a marker that facilitates recognition and measurement by the status observation device. Ideally, the marker is disposed on the aircraft-side docking device 101. The status sensing subsystem is electrically connected to the control system.

The control system 501 is configured to drive the mechanical arm 201 to dock and communicate with the aircraft 1, control the load isolation device, adjust the states of the guiding device and the braking unit, and coordinate the work of each unit of the control system during the subsequent recovery process. Once a recovery task is confirmed, the sensing control system determines the recovery trajectory of the aircraft and initially defines a docking area according to the states of the aircraft and the recovery system. The docking area refers to an area near a collision point between the docking device of the recovery system and the docking device of the aircraft, which is initially determined by control algorithms. The control system controls the mechanical arm to enter a standby state, so that the mechanical arm can rapidly drive the docking device to dock with the aircraft when the docking device of the aircraft passes by the docking area. Typically, as the aircraft flies towards the docking area, the control system calculates a new docking area in real time to achieve accurate and reliable docking. The control system is primarily configured to run the control algorithms and issue execution commands based on the acquired feedback data and information from other components. Its carrier is implemented collaboratively by one or more of an independent controller of the recovery system, a controller of the recovered aircraft, or an external controller of the recovery system. The executed algorithms include, but are not limited to, algorithms considering only the dynamics of the recovery system while neglecting the dynamics of the carrier aircraft, algorithms comprehensively considering complex multi-rigid-body dynamics of both the recovery system and the carrier aircraft, and integrated dynamics algorithms comprehensively considering the recovery system, the recovered aircraft, and environmental disturbances. The algorithms may be executed through centralized computation by an independent controller, distributed computation by controllers distributed across different components mentioned above, or external server computation.

In some embodiments, the system further includes an environmental sensing subsystem 502, configured to sense environmental information required for the recovery process. The subsystem includes at least one of an anemometer, an anemoscope, a radar, a laser radar, a vision sensor, and a means obtaining from third-party information sources. These sensing and probing devices are electrically connected to the control system. Once the recovery task is confirmed, the sensing control system acquires environmental parameters at the recovery system, determines task information such as the trajectory and speed of the aircraft to be recovered, and sends such information to the aircraft. After the aircraft enters the sensing range of the status observation device based on the onboard navigation control system, the status observation device acquires the state/states information of the aircraft and shares this information with other participants during the recovery process when necessary.

The recovery process of the present embodiment is as follows:

When the aircraft 1 reaches the designated area, the system sends recovery information to the aircraft 1, or the aircraft 1 sends return information to the system, allowing the system and the aircraft 1 to enter the recovery procedure. The system prepares for recovery. The sensing control system 5 monitors the states of this system and the aircraft 1 and sends docking and recovery information in due time. The high-dynamic precise docking subsystem 2 and the guiding and braking subsystem 3 are in place, and the docking device 301 may be predisposed on the U-shaped clamp 202 of the mechanical arm 201, or the mechanical arm 201 controls the U-shaped clamp 202 to pick up the docking device 301. The aircraft 1 enters a reachable docking range, and the mechanical arm 201 docks with the aircraft 1 rapidly with its high-dynamic and high-precision motion capability. The aircraft 1 drives the docking device 301 to detach from the U-shaped clamp 202 of the mechanical arm 201, completing load transfer. The guiding rod 302 and the winch 304 jointly provide motion trajectory guidance and deceleration buffering for the aircraft 1. During this process, the guiding rod 302 and the winch 304 work together to pull the aircraft 1 back in due time, completing the recovery task in this stage.

Figure 10:
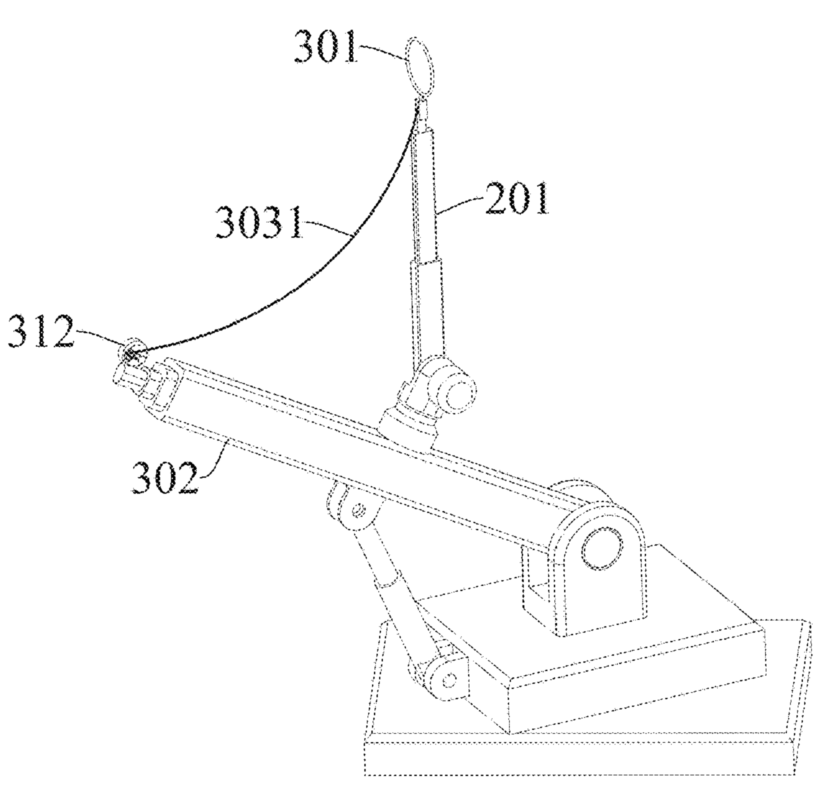
FIG. 10 is a perspective view of Embodiment 1.2 according to one aspect of the present disclosure.

Embodiment 1.2 may refer to FIG. 10, where when the aircraft 1 has high control precision, the mechanical arm 201 can be miniature, consequently requiring minimal operational space. If mounted on the base 4, the aircraft 1 needs to fly at an excessively low altitude prior to recovery, which could affect safety. Based on Embodiment 1.1, the difference lies in installing the fixed end of the mechanical arm 201 at the highest point of the outermost casing of the guiding rod 302 at the primary stage, which avoids the need for the aircraft 1 to flow too low. In this case, the guiding rod 302 can serve as a component of the mechanical arm 201 and provides a certain amount of height support for the mechanical arm. Therefore, the mechanical arm 201 can be designed smaller and further lighter. In the present embodiment, brake components are disposed between various sections of the guiding rod 302, with implementation already documented in Embodiment 1.1, allowing the participation of the guiding rod 302 in the braking of the aircraft 1. Alternatively, the guiding rod 302 with ability to autonomously extend and retract may be selected to facilitate the braking and recovery of the aircraft 1. In the present embodiment, the guiding cable 3031 is directly connected to the cable adjuster 312 at the end of the guiding rod 302. The cable adjuster 312 controls the length of the guiding cable 3031 at the end of the guiding rod 302.

Figure 11:
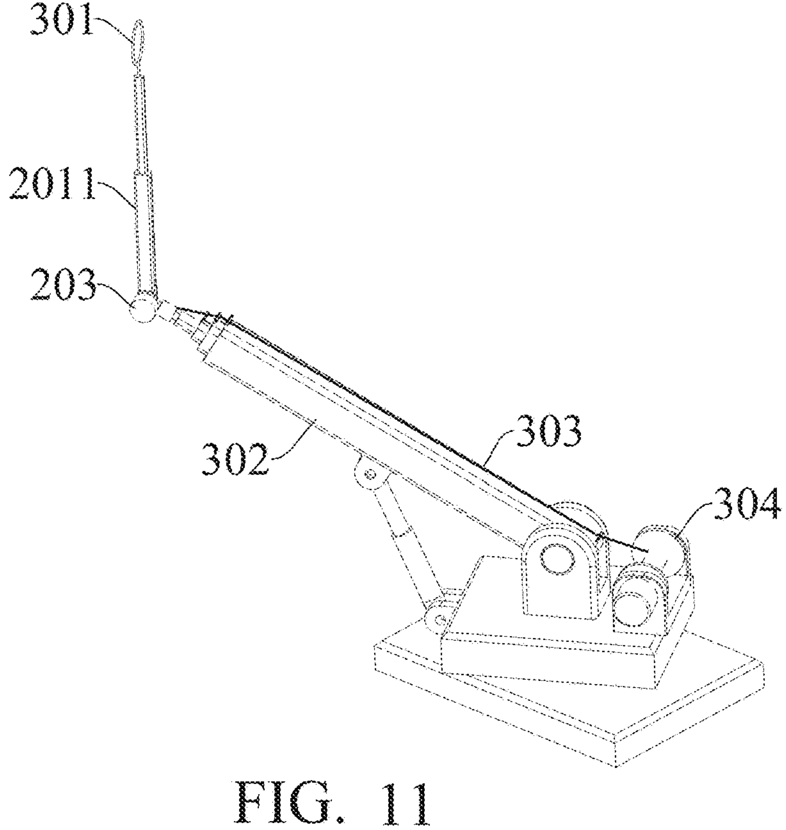
FIG. 11 is a perspective view of Embodiment 1.3 according to one aspect of the present disclosure.

Embodiment 1.3, referring to FIG. 11, is based on Embodiment 1.2, with differences described as follows.

A fixed end of the RRP-type mechanical arm 2011 is mounted at the end of the last section of guiding rod 302, and the docking device 301 is fixedly connected to a free end of the mechanical arm 2011 through a fastener, which can also be regarded as an implementation of the retaining member. A first R-axis of the mechanical arm 2011 is parallel to the length direction of the guiding rod 302, and a second R-axis is vertical to the first R-axis. In combination of P kinematic pair, the docking device 301 is driven to a designated position in a three-dimensional space. The end of the guiding cable 303 is transferred from the docking device 301 to the fixed end of the mechanical arm 2011, or both the guiding cable 303 and the winch 304 are removed. In the present embodiment, load isolation is achieved by a torque-limiting coupling 203 disposed in the mechanical arm. After the aircraft 1 docks and locks with the docking device 301, the docking device 301 drives the mechanical arm 2011 to move, and the torque-limiting coupling 203 prevents the servo drive from an impact load caused by the aircraft 1. The mechanical arm 2011 enters a passive working state. Ideally, a lever of the mechanical arm 2011 can be understood as a "two-force rod", with a function similar to the guiding cable 303 in Embodiment 1.1 and Embodiment 1.2. In the case of the currently used mechanical arm 2011, the strength of the lever of the mechanical arm 2011 being pulled depends on the strength of its material, which is typically much greater than the drive capacity of the servo mechanism of the mechanical arm 2011. Therefore, under the effect of load isolation, the mechanical arm 2011, which has a servo drive with a low load capacity but high dynamic capability and precision, can still be employed to directly dock with the aircraft 1 for capture and recovery.

Figure 12:
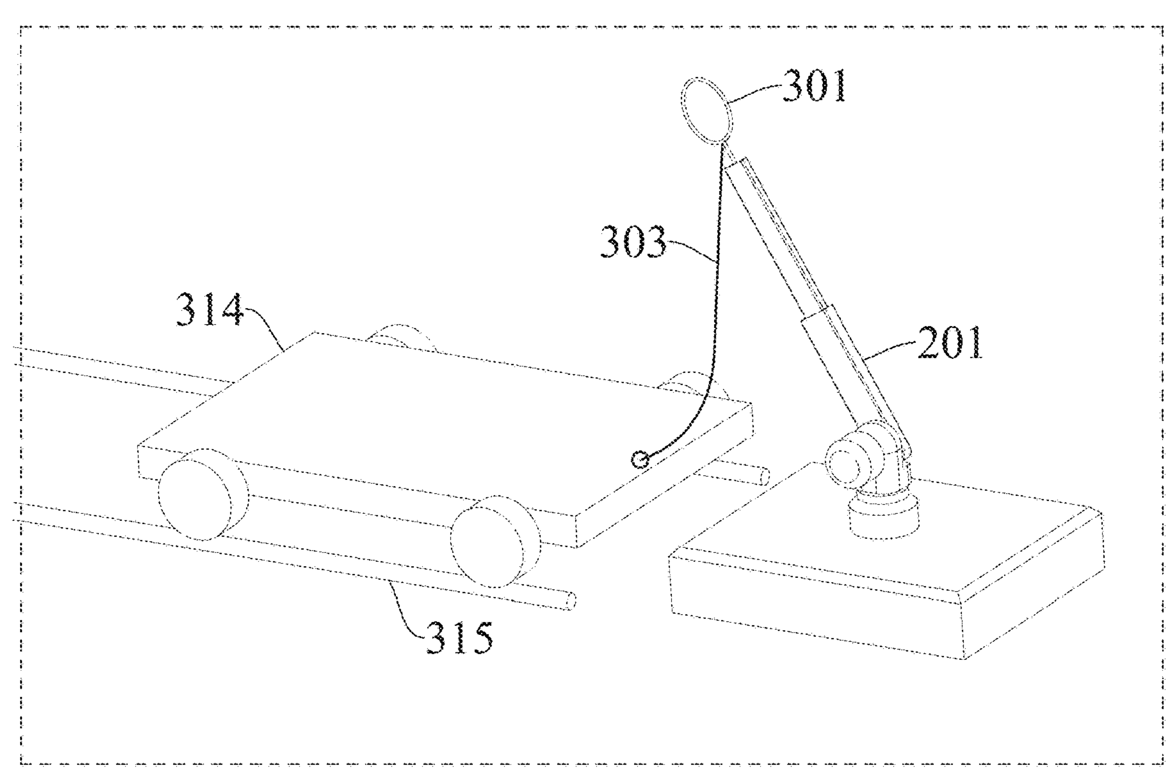
FIG. 12 is a perspective view of Embodiment 1.4 according to one aspect of the present disclosure.

Embodiment 1.4, referring to FIG. 12, is based on Embodiment 1.1, where a guiding device can be implemented using a mobile platform. The mobile platform may be a platform moving on surface, water, snow, ice, and near-ground environments, such as a trolley, a marine vessel, and a pulley disposed on a guide rail. In the present embodiment, the mobile platform is a trolley 314. In some embodiments, the trolley 314 is covered by a cushion pad configured to assist the landing of the aircraft 1. In some embodiments, the trolley 314 may be provided with a guide rail 315, with a guiding function similar to the guiding rod 302 controlling the motion trajectory of the aircraft 1. One end of the guiding cable 303 is connected to a guider 301, and the other end is connected to the trolley 314. The guider 301 is still disposed on the mechanical arm 201. The flight direction of the aircraft 1 is the same as the heading direction of the trolley 314. When the aircraft 1 pulls the docking device 301 from the mechanical arm 201, the guiding cable 303 is gradually tightened to drive the trolley 314 to move. Under the braking of the aircraft 1 and the trolley 314, the aircraft 1 eventually lands onto the trolley 314 and gradually stops along with the trolley 314. The trolley 314 may utilize friction between its wheels and the rail 315 to provide a braking or driving force.

In some embodiments, the braking or driving force of the trolley can be achieved by using a winch to drag the trolley. Similarly, a toothed rail and other rails with additional kinematic pairs may be employed to achieve better adjustment of the braking or driving force.

In some embodiments, a power drive device is disposed on the mobile platform. The power drive device drives the platform, reducing the speed difference between the platform and the recovered aircraft 1. This prevents damage to the aircraft due to overload pull force resulting from a speed difference between the aircraft 1 and a stationary mobile platform.

Figure 13:
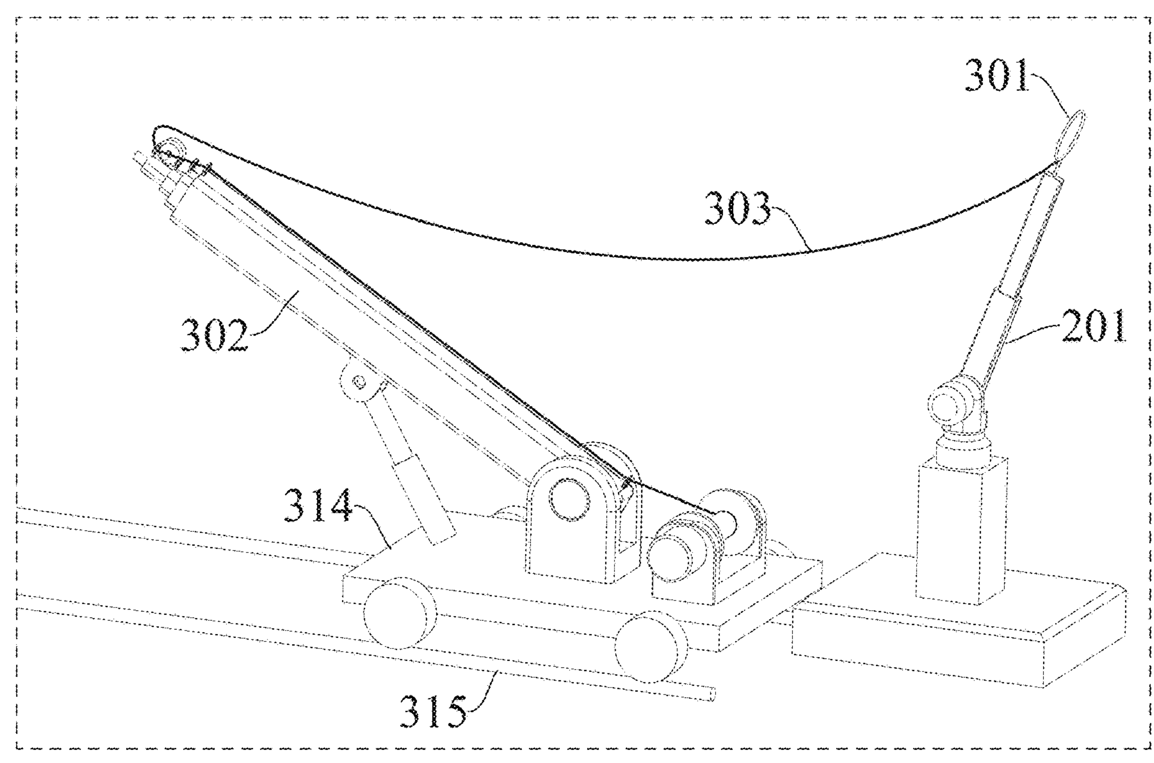
FIG. 13 is a perspective view of multiple tasks in Embodiment 1.5 according to one aspect of the present disclosure.

Embodiment 1.5, referring to FIG. 13, is based on Embodiment 1.4. The guiding rod 302 in Embodiment 1.1 is installed on the trolley 314. The guiding device in the present embodiment is implemented by combining the guiding rod 302 and the trolley 314, enabling to guide and brake the aircraft 1 in multiple ways.

Figure 14:
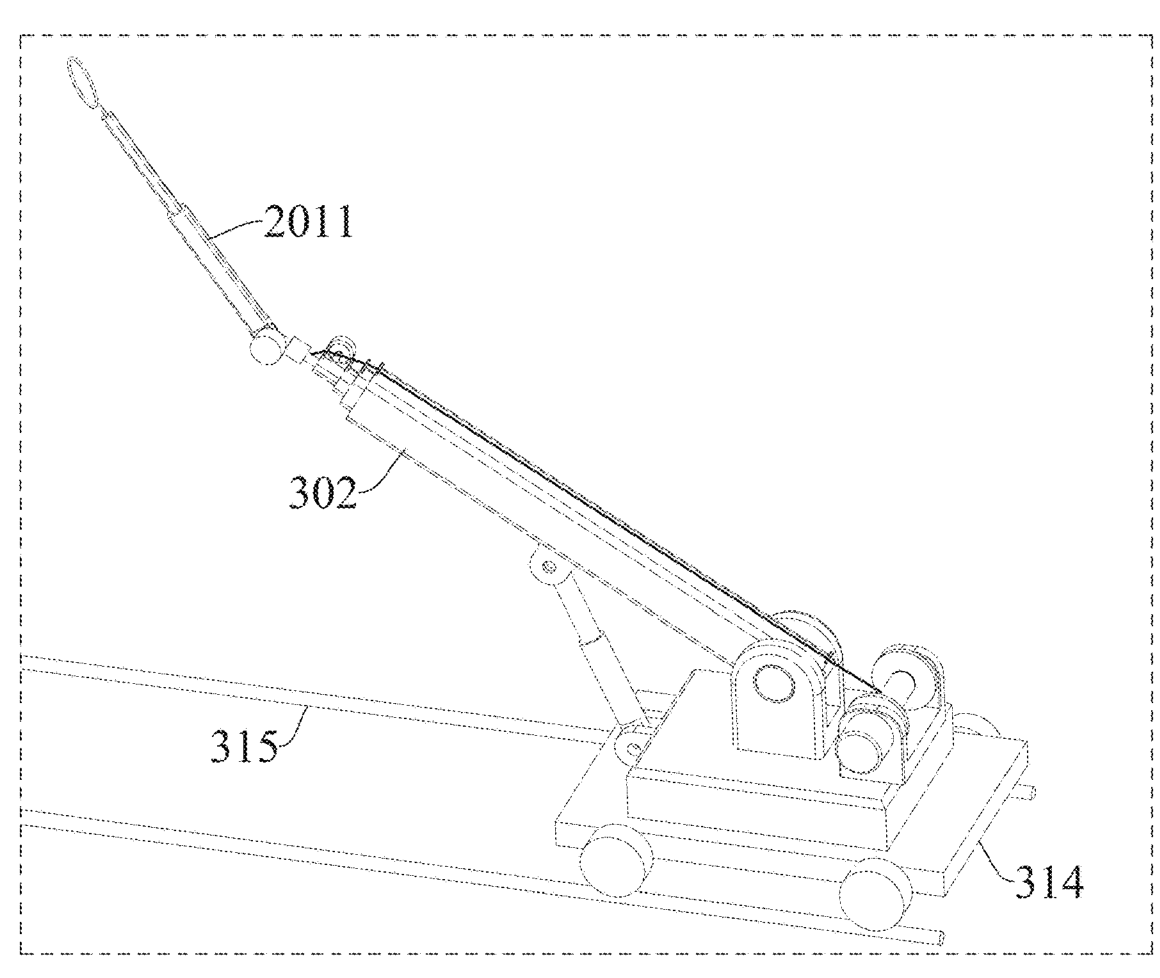
FIG. 14 is a perspective view of Embodiment 1.6 according to one aspect of the present disclosure.

Embodiment 1.6, referring to FIG. 14, is based on Embodiment 1.4. The overall structure in Embodiment 1.3 is fixedly installed on the trolley, allowing for a more flexible working mode. For example, when the docking speed of the aircraft is too high, the overall system can first accelerate to match the speed of the aircraft, thereby preventing damage to the system caused by an excessive impact. Similarly, the overall structure in Embodiment 1.1 or Embodiment 1.2 can also be fixedly installed on the trolley.

In some embodiments, the telescopic mechanism and/or mechanical arm in the embodiments mentioned above may rotate about their respective axis or a shared axis perpendicular to the ground. This allows for a more optimal posture when docking and guiding the target. For example, the guiding rod 302 and the mechanical arm 201 in Embodiment 1.1 are equipped with revolute joints at their respective fixed ends, allowing them to rotate around an axis perpendicular to the base 4. Alternatively, the base 4 may itself rotate, causing the guiding rod 302 and the mechanical arm 201 to rotate together. These two methods can also be combined. In the case of Embodiment 1.2, the revolute joint used for rotation may be provided at the fixed end of the guiding rod 302 to achieve co-rotation.

In some embodiments, the telescopic mechanism and/or mechanical arm in the embodiments mentioned above may translate in a horizontal direction or/and in a direction perpendicular to a flight direction of the target, in order to expand and optimize the reachable docking range. For example, the guiding rod 302 and/or mechanical arm 201 in Embodiment 1.1 may be provided with translation devices on their respective fixed end. For example. two groups of slide rails are arranged on the base, along with controllable slide seats on the slide rails, where the guiding rod 302 and the mechanical arm 201 are placed on their respective slide seats. Alternatively, rails may be arranged on the ground, along with controllable slide seats on the rails, and the base 4 is placed on the slide seat. A combination of both methods is also possible.

Figure 16:
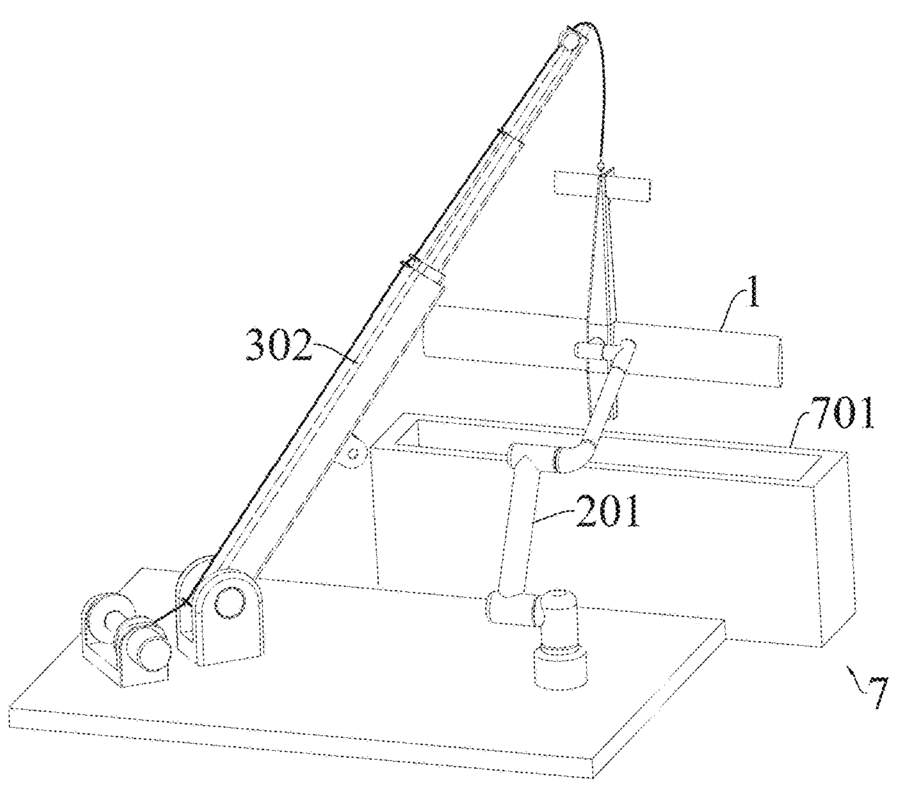
FIG. 16 is a perspective view of a storage subsystem in an embodiment according to one aspect of the present disclosure.

In some embodiments, referring to FIG. 16, this recovery system is further provided with a storage subsystem 6, including at least one storage cabin 601. After the braking of the aircraft 1, the guiding rod 302 can guide the aircraft 1 to a storage position, relying on the large-tolerance entry of the storage cabin 601 or a dedicated large-tolerance equipment to smoothly enter the storage cabin 601.

In some embodiments, the guiding device moves the aircraft within a range that the mechanical arm can control. Subsequently, the aircraft is placed in the storage cabin by both the mechanical arm and the guiding device or by the mechanical arm alone. The mechanical arm here may be either an independent mechanical arm configured for the storage subsystem to achieve storage or a reusable mechanical arm from the high-dynamic precise docking subsystem.

During the recovery stage, the storage docking between the mechanical arm and the aircraft may be achieved using a dedicated docking design. The dedicated docking design is disposed at a mechanical arm side, an aircraft side, or both sides simultaneously, depending on the specific circumstances. The storage docking device disposed at the mechanical arm side may be designed as an integrated form or an additional attachment. The integrated docking device may be mounted at the last section of the mechanical arm or another suitable level section. To avoid interference with other parts of the system, the docking device may be designed in a foldable manner. The docking device in the attachment form may be mounted at a designated position of the system and is docked with the mechanical arm through a reconfiguration method when necessary, thereby allowing the mechanical arm to use the storage docking device. If the mechanical arm does not have sufficient degrees of freedom, additional degrees of freedom may be added through reconfiguration to reassemble the mechanical arm into one with enough degrees of freedom. Here, the term of "reconfiguration" refers to the reconfiguration techniques in the robotics field, which will not be elaborated here.

In the embodiments above, buffers or buffer components may be designed for parts that needed to reduce impact. For example, a spring or a spring damper may be disposed between a cable and a trolley.

In the embodiments above, braking components of the guiding and braking subsystem can be flexibly combined. For example, various braking methods such as the guiding rod, the winch, the mobile platform, and an inclined surface may be optimally selected and combined according to the application environment.

Figure 15:
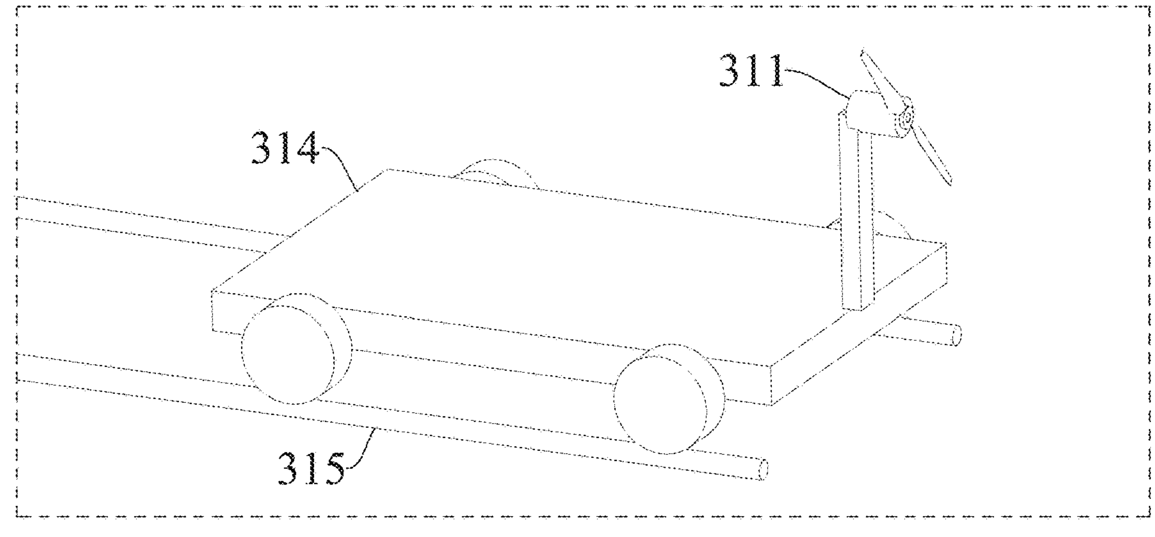
FIG. 15 is a perspective view of a propeller applied to a trolley according to one aspect of the present disclosure.

In some embodiments, for the braking components, a pneumatic device may be disposed on the guiding device, providing a braking force. For example, a propeller 311 may be employed to provide the braking force. The propeller 311 may be disposed on the trolley 314 as shown in FIG. 15. The advantage of the pneumatic device also lies in that it can provide the braking force and can provide the driving force at an initial speed for the guiding device.

The present recovery system can be configured to recycle a cargo 7 carried by the aircraft 1. In this way, the cargo 7 can be delivered precisely to the system without requiring the aircraft 1 to stop. The recovery system may still be implemented by using any of the aforementioned embodiments. The docking target in this system is the cargo 7 in motion in the air, typically carried by the aircraft 1.

Figure 17:
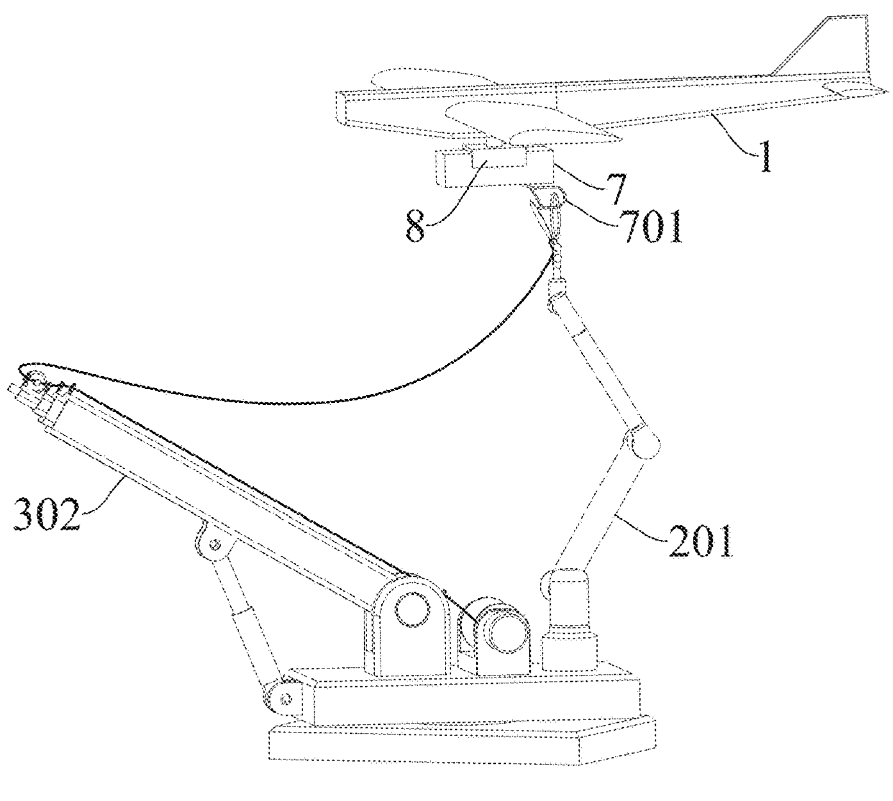
FIG. 17 is a perspective view of cargo recovery according to one aspect of the present disclosure.

In some embodiments, as shown in FIG. 17, the recovery system in the present embodiment is implemented on the basis of the recovery system in Embodiment 1.1. The aircraft 1 should be equipped with a controllable clamping device 8 configured to clamp the cargo 7 and release it from the aircraft 1 under certain conditions. The clamping device 8 employs a conventional design, and is not detailed here. The cargo 7 or its container is provided with a cargo docking device 701, which may adopt the same type of the aircraft-side docking device 101 in the embodiments mentioned above. When the aircraft 1 carrying the cargo 7 passes by the recovery system, the mechanical arm 201 drives the docking device 301 to dock with the cargo-side docking device 701. The docking action triggers the clamping device 8 on the aircraft 1 to release the cargo 7. Once released, the cargo 7 detaches from the aircraft 1 and is recovered by the recovery system. Taking the system shown in FIG. 21 as an example, an electromagnetic retaining member is mounted at the end end of the mechanical arm 201 and is equipped with an electromagnetic docking device. The docking device is equipped with a toggle plate. When the toggle plate is touched by the docking device on the cargo to deviate from a ring on the docking device, a switch is activated. Accordingly, the recovery system then sends docking confirmation information to the aircraft, and the aircraft commands the clamping device to release the cargo, causing it to detach and be recovered by the recovery system. The subsequent recovery process of the cargo is similar to the recovery process of the aircraft, and is not repeated here.

Compared with the prior art, the present disclosure has the following advantages:

1. Compactness and light weight. The present disclosure combines high-precision and high-dynamic docking capability, thereby requiring only minimal docking components, which avoids large-sized large-tolerance systems commonly found in the prior art. By adopting a design that separates docking from buffering, the present disclosure minimizes the size and weight of a high-precision high-value mechanical arm. Subsequent buffer components primarily bear tensile forces, leading to a more balanced internal load distribution in various components of the system, and further enabling the structures of the components to be light.
2. High precision, high dynamics, and high reliability. The present disclosure combines high-precision and high-dynamic docking capability while maintaining a light weight. The high-precision and high-dynamic docking capability ensures reliable docking of the system.
3. Superior portability. Due to its small size, light weight, and primarily rod-shaped components, the system offers superior folding capability and portability.
4. Support weight reduction of the docked target. Thanks to its extremely high docking precision, the docking device of the target does not need to be designed with large tolerance and can be made very compact, which is particularly important for the aircraft.
5. Low cost. By adopting the design that separates docking from buffering, the present disclosure minimizes the size and weight of the high-precision high-value mechanical arm, thereby substantially reducing the overall cost of the system.

6. High degree of automation. Compared with the prior art, the present disclosure enables effective recovery of the aircraft in a controllable range of the system. The position of the recovered aircraft in the system can be acquired accurately through a sensor system and effectively controlled by the system. Therefore, this full controllability enables easy implementation of automation.

The present disclosure provides an airborne differential-speed target precise docking and recovery system. The present disclosure is intended to enable an airborne carrier aircraft to recover a moving target in the air, particularly suitable for a target at a significant relative speed to the carrier aircraft. Here, "a significant relative speed" refers to a noticeable speed difference between the carrier aircraft and the target. The target refers to the aircraft, items carried by the aircraft, or both. These items may include, but are not limited to, cargo, fuel, batteries, and the like. For example, the system can be applied in a mother-child aircraft system. By arranging the system on a mother aircraft, the child aircraft performing a task can be recovered and released, allowing for the reuse of the child aircraft. The system can also be used for aerial cargo transportation. The aircraft responsible for transportation can receive cargo from other nearby aircraft in the air, enabling rapid cargo transportation in complex terrain conditions. This system can also be configured to extend the range of the aircraft. For example, for patrol aircraft operating on a specific route, energy supply stations can be set up along the way. By the aircraft for transferring between the energy supply stations and the patrol aircraft, energy from the energy supply stations can be transferred to the patrol aircraft, so that its range can be significantly increased. Ideally, unlimited endurance can be achieved.

The technical principles of the airborne differential-speed target precise docking and recovery system are the same as those of the ground-based differential-speed target precise docking and recovery system, and are not elaborated here.

Figure 18:
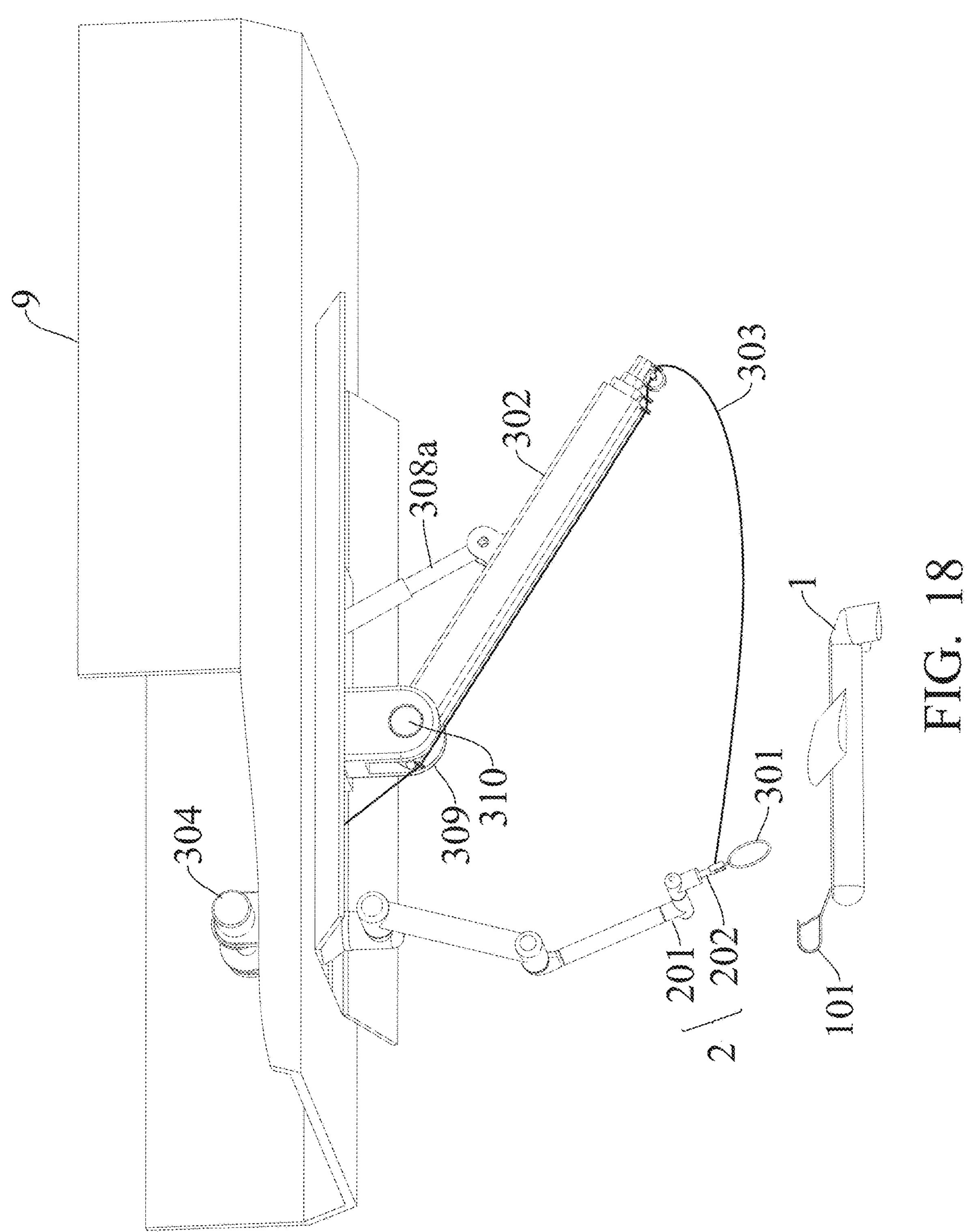
FIG. 18 is a perspective view of Embodiment 2.1 according to one aspect of the present disclosure.

Embodiment 2.1 may refer to FIG. 18. In the present embodiment, a high-dynamic precise docking subsystem 2 includes a 6-degree-of-freedom mechanical arm 201 and a U-shaped clamp 202 as retaining members. A carrier aircraft is equipped with a base, which can be disposed at the bottom of fuselage or inside the fuselage or any other suitable positions according to specific applications. A fixed end of the mechanical arm 201 is fixed on the base, and a free end is provided with the U-shaped clamp 202. The opening direction of the U-shaped clamp 202 is the same as a flight direction of an aircraft recovered. A guiding and buffering subsystem 3 includes an annular docking device 301, a guiding device, a guiding cable 303, and a winch 304 with a buffering function, where the guiding device is fixedly installed on the base. In the present embodiment, the guiding device is a multistage telescopic guiding rod 302. In the present embodiment, a docking device includes a coupling portion, which is equipped with a rod body. The retaining member is implemented using the U-shaped clamp 202, as shown in FIG. 2. The rod body 3012 is configured to connect to the U-shaped clamp 202, and the docking device 301*a* is maintained on the U-shaped clamp 202 through friction and maintains a constant relative position during the motion process of the mechanical arm 201. The coupling portion 3011 is a closed ring, sized to correspond to the control precision of the relative state between the mechanical arm 201 and the aircraft 1. An aircraft-side docking device 101 engages with the docking device 301 of the system. In some embodiments, the aircraft-side docking device 101 is implemented using a hook with a locking function. For example, the aircraft-side docking device 101 employs a self-locking hook with a self-locking function, as shown in FIG. 3. Alternatively, the aircraft-side docking device employs an electromagnetic hook with an electromagnetic locking function, as shown in FIG. 4. When the aircraft-side docking device 101 collides with the coupling portion 3011, the two are engaged and locked. Meanwhile, since the maximum friction between the rod body 3012 of the docking device 301*a* and the U-shaped clamp 202 is sufficiently, the aircraft 1 drives the docking device 301*a* to detach from the U-shaped clamp 202. One end of the guiding cable 303 is connected to the winch 304, and the other end passes through the guide ring 307 disposed at the end of the last section of the guiding rod 302 and then connects to the docking device 301*a*. The connection between the rod body 3012 of the docking device 301*a* and the U-shaped clamp 202 is maintained and separated through specific friction between them, achieving load isolation. The load isolation design needs to satisfy the following conditions: a retention force between the U-shaped clamp 202 and the docking device 301*a* meets the requirements for high-dynamic motion, while also providing a force necessary for reliable docking between the docking device 301*a* and the aircraft-side docking device 101. A load imposed on the mechanical arm 201 caused by the maximum retention force between the U-shaped clamp 202 and the docking device 301*a* is smaller than the carrying capacity of the servo drive device of the mechanical arm 201. Therefore, the minimum friction can enable the docking device 301*a* to follow the high-dynamic motion of the mechanical arm 201, thereby compensating for the state difference between the aircraft 1 and the base, and ensuring reliable docking between the docking device 301*a* and the aircraft 1. The maximum friction is designed to ensure that the docking device 301*a* can detach from the U-shaped clamp 202 without overloading the mechanical arm 201. Once the aircraft 1 flies over the reachable range of the mechanical arm 201, the mechanical arm 201 guides the docking device 301*a* to dock and lock with the aircraft-side docking device 101 rapidly. Under the impact from the aircraft 1, the docking device 301*a* detaches from the U-shaped clamp 202. Since the maximum friction between the U-shaped clamp 202 and the docking device 301*a* is smaller than the load capacity of the mechanical arm 201, no damage to the mechanical arm 201 is caused in this process. The load from the aircraft 1 is directly transferred from the mechanical arm 201 to the guiding rod 302, further fully achieving load isolation.

In the present embodiment, load isolation is achieved through the aforementioned method. The mechanical arm 201 only needs to bear the weight of the docking device 301*a* and the limited impact force required for detaching the docking device 301*a* from the U-shaped clamp 202. Therefore, compared with applications bearing the full load of the aircraft 1, the mechanical arm 201 can maintain the same dynamic motion capability while remaining compact in structure, lightweight, and cost-effective.

In some embodiments, the coupling portion 3013 of the docking device 301*b* can be designed to enable controllable opening and closing, as shown in FIG. 6, so as to facilitate disengagement from the recovered target during the subsequent recovery process. In some embodiments, the docking device 301*c* and the retaining member may also be connected through a magnetic retaining member 2021, as shown in FIG. 7. For example, the docking device 301*c* can be maintained on the retaining member through a permanent magnet, where the magnetic force is designed similarly to the friction mentioned above. Alternatively, an electromagnetic method may be adopted and achieved in the same way as permanent magnet. The electromagnetic force can be controlled by triggering a switch during the action process, allowing for connection and disconnection between the retaining member 2021 and the docking device 301*c*. Control methods of the electromagnetic force include, but are not limited to: a mechanical switch (typically a micro switch), a photoelectric switch, machine vision judgment, and the like.

In some embodiments, as shown in FIG. 8, the guiding cable 303 is equipped with a first limiting block 305 and a second limiting block 306, the first limiting block 305 and the second limiting block 306 being disposed at both sides of the guide ring 307 at an end of the guiding rod 302 along the extension direction of the guiding cable 303. When the docking device 301 moves with the aircraft 1, the guiding cable 303 is pulled, and the first limiting block 305 moves to the guide ring 301 and is pressed against the guide ring. The guiding cable 303 is pulled tight to further drive the guiding rod 302 to progressively extend. During the extension process, the guiding rod 302 provides a path guidance for the aircraft 1, thereby controlling the path and overall trajectory of the aircraft 1. As the guiding rod 302 is progressively extended, its force on the aircraft 1 changes little during the whole process, thereby preventing the aircraft 1 from experiencing excessive instantaneous impact.

In some embodiments, the guiding cable 303 passes through the guide ring 307 disposed at an end of the guiding rod 302 of each stage and then connects to the docking device 301. Alternatively, in some examples, the function of the guide ring 307 mentioned above can be implemented within the guiding rod 302, where the guiding cable 303 passes through the interior of the guiding rod 302 and exits from a through hole formed in an end of the guiding rod 302. The through hole serves as an implementation of the guiding element. In addition, in order to restrict the relative motion between the guiding cable 303 and the end of the guiding rod 302, in addition to a limiting block installed on the guiding cable 303, in some embodiments, the guiding cable 303 has an enough length reserved at the end of the guiding rod 302 and is fixed at the end of the guiding rod 302 through a fastener. In addition, in some embodiments, as shown in FIG. 9, a cable adjuster 312 is provided at the last section of the guiding rod 302 to adjust the length or release speed of the guiding cable 303 at the end of the guiding rod 302. The cable adjuster 312 includes a motor 3121. An output end of the motor 3121 is equipped with a cable shaft 3122 for winding the cable. The guiding cable 303 winds around the cable shaft 3122 and then connects to the docking device 301. The cable adjuster 312 can be implemented in multiple ways belonging to conventional technologies, which will not be elaborated here. In the following implementations, the guiding cable 303 may be connected to the cable adjuster 308 to control the cable length.

As the aircraft 1 drives the guiding rod 302 to extend, the force acting on the aircraft 1 can be adjusted by controlling the torque of the winch 304 to achieve an optimal buffering effect. For example, by controlling the winch 304 to limit the pull force on the aircraft 1 to its maximum tolerable value, the shortest time and distance can be used to buffer the aircraft 1. This can minimize the system size and weight. In addition to the function of adjusting the buffering effect, the winch 304 can also recovery the guiding cable 303 after the aircraft 1 stops moving. During the recovery process of the guiding cable 303, the second limiting block 306 moves to the guide ring 307 and is pressed against the guide ring, and the guiding cable 303 continues to be recovered, driving the guiding rod 302 to contract progressively, while pulling the aircraft 1 back to for subsequent recovery operations. In some embodiments, the guiding cable 303 may only be equipped with the first limiting block 305, and the second limiting block 306 performs its limiting function by the docking device 301.

As the aircraft 1 drives the guiding rod 302 to extend, the following methods may also be adopted to enable the participation of the guiding rod 302 in buffering, adjusting the forces applied on the aircraft 1 during the buffering process.

In some embodiments, buffer components may be disposed between various rod sections of the guiding rod 302. For example, friction pieces are disposed between the rods to achieve buffering during guidance. Additionally, a pressure regulator for the friction pieces may be installed, allowing the friction to be controllable.

In some embodiments, the pull force applied by the guiding rod 302 on the aircraft 1 can be adjusted through aero-hydrodynamics by controlling air inflow during the extension process of the guiding rod 302. This is typically achieved by forming a hole in an end of the guiding rod 302 and installing a controllable air valve. Furthermore, in some embodiments, the guiding rod 302 can be given the ability to autonomously extend and retract by pressurizing air into and extracting air from it. In some implementations, this can assist the winch 304 mentioned in the solutions above to jointly buffer and recovery the aircraft 1. Alternatively, the winch may be removed, with the guidance, buffering, recovery and other tasks of the aircraft 1 being completed independently.

In some embodiments, aerodynamic devices such as a propeller may be installed on the guiding rod 302. During the extension process of the guiding rod 302, the buffering force applied to the aircraft 1 can be adjusted by controlling the pull force of these aerodynamic devices.

As the aircraft 1 is buffered or the guiding rod 302 is tightened, depending on the circumstances, the angle between the guiding rod 302 and the carrier aircraft is adjusted in due time through an angle adjustment device 309 for the following purpose:

In some embodiments, typically, the dynamic design of the docking process allows the guiding rod 302 naturally experience reasonable forces through a dynamic process. In order to enable the guiding rod 302 to adapt to various application environments, the position of an angle adjustment device 308*a* can be adjusted to ensure that the guiding rod 302 has an optimal guide slope. For example, a collision prevention limiter can be installed to prevent the guiding rod 302 from colliding with the body of the carrier aircraft. The angle adjustment device 308*a* can be implemented using a controllable telescopic mechanism.

In some embodiments, the angle of the guiding rod 302 may be adjusted during the recovery process, and together with other drive devices on the guiding rod 302, the aircraft 1 can be hoisted to a recovery position.

For adjusting the angle between the guiding rod 302 and the carrier aircraft, in some embodiments, the angle may also be adjusted through a rotating mechanism 310 disposed on a revolute joint 309 of the guiding rod 302 to achieve its purpose.

In the present disclosure, the guiding rod 302 is an abstract representation of a telescopic mechanism along certain linear degrees of freedom, including, but not limited to, a multistage telescopic rod, a guide rail sliding block, a range extension mechanism, and other functionally equivalent mechanisms as well as combinations thereof.

The recovery system is equipped with a sensing control system, including a status sensing subsystem and a control system.

The status sensing subsystem is configured to acquire the state/states information of each unit of the system, as well as the state/states information of an aircraft. The status sensing subsystem includes sensors disposed on various components of the recovery system and further includes a status observation device configured to monitor an aircraft. The status observation device is configured to measure the motion state of the aircraft, including position and attitude. The status observation device may be flexibly arranged at locations convenient for status observation, including, but not limited to: a mechanical arm, a carrier aircraft, an aircraft body, a third party, and any combinations of these locations. The status observation device may be equipment that directly acquires the relative state of an observed object. For example, optical measurement methods may be employed, typically using monocular, binocular, or multiocular camera imaging and their corresponding vision modalities for recognition and measurement through machine vision. Alternatively, equipment for acquiring relative state based on radar, millimeter wave, ultrasonic positioning, satellite positioning, and the like may be employed. Alternatively, multisensor fusion status observation equipment combinations and algorithms integrating the aircraft's inertial sensor, combined navigation system, and the aforementioned positioning methods may be employed. In some embodiments, the aircraft is provided with a marker that facilitates recognition and measurement by the status observation device. Ideally, the marker is disposed on the aircraft-side docking device.

The control system is configured to drive the mechanical arm to dock and communicate with the aircraft, control the load isolation device, adjust the states of the guiding device and the braking unit, and coordinate the work of each unit of the control system during the subsequent recovery process. Once a recovery task is confirmed, the sensing control system determines the recovery trajectory of the aircraft and initially defines a docking area according to the states of the aircraft and the recovery system. The docking area refers to an area near a collision point between the docking device of the recovery system and the docking device of the aircraft, which is initially determined by control algorithms. The control system controls the mechanical arm to enter a standby state, so that the mechanical arm can rapidly drive the docking device to dock with the aircraft when the docking device of the aircraft passes by the docking area. Typically, as the aircraft flies towards the docking area, the control system calculates a new docking area in real time to achieve accurate and reliable docking. The control system is primarily configured to run the control algorithms and issue execution commands based on the acquired feedback data and information from other components. Its carrier is implemented collaboratively by one or more of an independent controller of the recovery system, a controller of the recovered aircraft, or an external controller of the recovery system. The executed algorithms include, but are not limited to, algorithms considering only the dynamics of the recovery system while neglecting the dynamics of the carrier aircraft, algorithms comprehensively considering the complex multi-rigid-body dynamics of both the recovery system and the carrier aircraft, and integrated dynamics algorithms comprehensively considering the recovery system, the recovered aircraft, and environmental disturbances. The algorithms may be executed through centralized computation by an independent controller, distributed computation by controllers distributed across different components mentioned above, or external server computation.

In some embodiments, the sensing control system further includes an environmental sensing subsystem, configured to sense environmental information required for the recovery process. The subsystem includes at least one of an anemometer, an anemoscope, a radar, a laser radar, a vision sensor, and a means obtaining from third-party information sources. These sensing and probing devices are electrically connected to the control system. Once the recovery task is confirmed, the sensing control system acquires environmental parameters at the interchange position, determines task information such as the trajectory and speed of the aircraft to be recovered, and sends such information to the aircraft. After the aircraft enters the sensing range of the status observation device based on the onboard navigation control system, the status observation device acquires the state/states information of the aircraft and shares this information with other participants during the recovery process when necessary.

The recovery process of the present embodiment is as follows.

When the carrier aircraft reaches a designated area, the system sends recovery information to the aircraft 1 or the aircraft sends return information to the system, allowing the system and the aircraft to enter the recovery procedure. The carrier aircraft makes recovery preparations, and the system is activated. The sensing control system monitors the states of the carrier aircraft, the aircraft 1 and this system, and sends docking and recovery information in due time. The high-dynamic precise docking subsystem 2 and the guiding and buffering subsystem 3 are in place, and the docking device 301 may be predisposed on the retaining member of the mechanical arm 201, or the mechanical arm 201 controls the retaining member to pick up the docking device. The aircraft 1 enters a reachable docking range, and the mechanical arm 201 docks with the aircraft 1 rapidly with its high-dynamic high-precision motion capability. The aircraft 1 drives the docking device 301 to detach from the retaining member of the mechanical arm 201, completing load transfer. The guiding rod 302 and the winch 304 jointly provide motion trajectory guidance and deceleration buffering for the aircraft 1. During this process, the guiding rod 302 and the winch 304 work together to pull the aircraft 1 back in due time, completing the recovery task in this stage.

Figure 19:
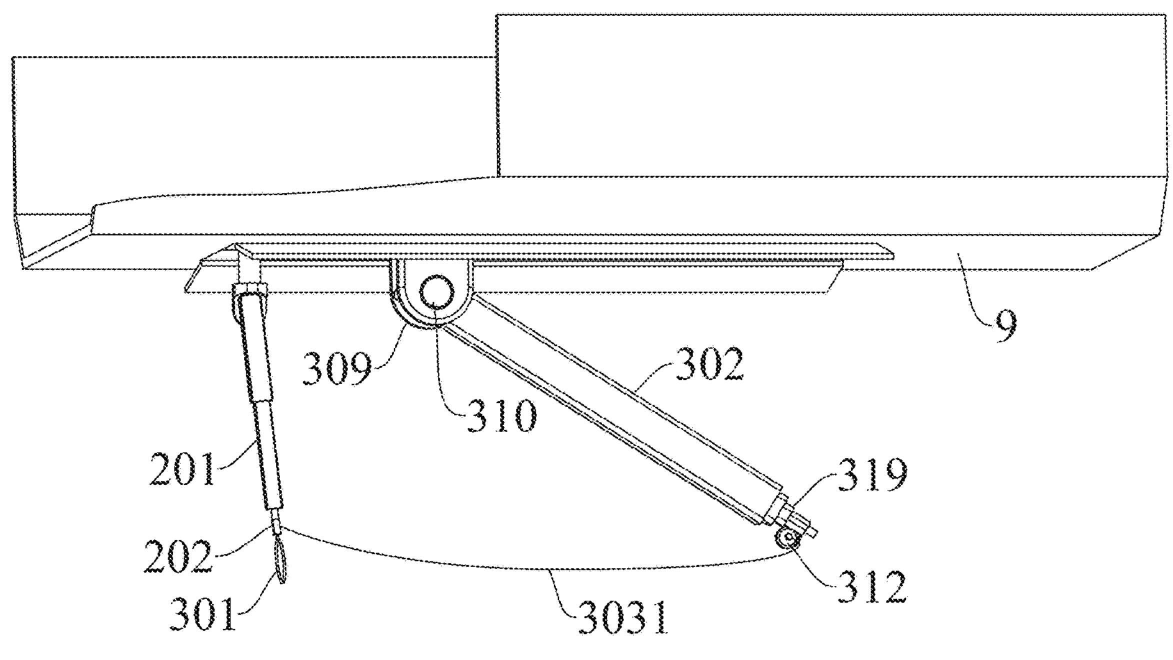
FIG. 19 is a perspective view of Embodiment 2.2 according to one aspect of the present disclosure.

In Embodiment 2.2, the mechanical arm 201 can be flexibly configured with the degrees of freedom and structural forms according to task requirements. Typically, the at least 2 positional degrees of freedom are needed to enable the docking device to dock with the aircraft 1. In the present embodiment, a commonly used configuration is an RRP-type 3-DOF mechanical arm shown in FIG. 19. In the present embodiment, based on Embodiment 2.1, the guiding rod 302 is equipped with an autonomous telescopic drive mechanism 319. In some embodiments, the pull force applied by the guiding rod 302 on the aircraft 1 can be adjusted through aero-hydrodynamics by controlling air inflow during the extension process of the guiding rod 302. The guiding rod 302 can be given the ability to autonomously extend and retract by pressurizing air into and extracting air from it, with the guidance, buffering, recovery and other tasks of the aircraft 1 being completed independently. In the present embodiment, one end of the guiding cable 3031 is connected to the cable adjuster 312 fixedly installed at the end of the guiding rod 302, and the other end is connected to the docking device 301. The length of the guiding cable 3031 at the end of the guiding rod 302 is adjusted through the cable adjuster 312. In some embodiments, the guiding cable 3031 is fixedly connected to the end of the guiding rod 302 through a fastener. In the present embodiment, the angle between the guiding rod 302 and the carrier aircraft is adjusted through a rotating mechanism 310 disposed on a revolute joint 309 of the guiding rod 302.

Figure 20:
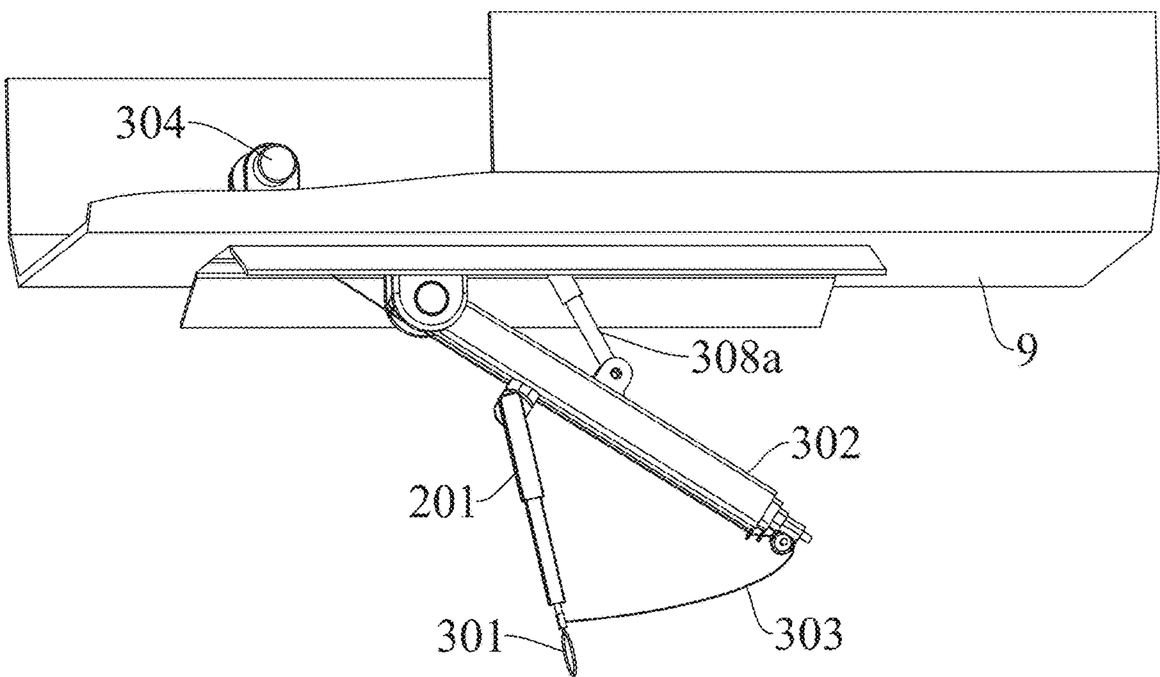
FIG. 20 is a perspective view of Embodiment 2.3 according to one aspect of the present disclosure.

Embodiment 2.3 may refer to FIG. 20, where when the recovered aircraft 1 has high control precision, the mechanical arm 201 can be miniature, consequently requiring minimal operational space. Based on Embodiment 2.1, the difference lies in installing the fixed end of the mechanical arm 201 at a low point of the outermost casing of the guiding rod 302 in the primary stage, which avoids the need for the aircraft 1 to get too close to the carrier aircraft. In this case, the guiding rod 302 can serve as a component of the mechanical arm 201 and provides a certain amount of basic distance between the mechanical arm 201 and the carrier aircraft. Therefore, the mechanical arm 201 can be designed smaller and further lighter.

Figure 21:
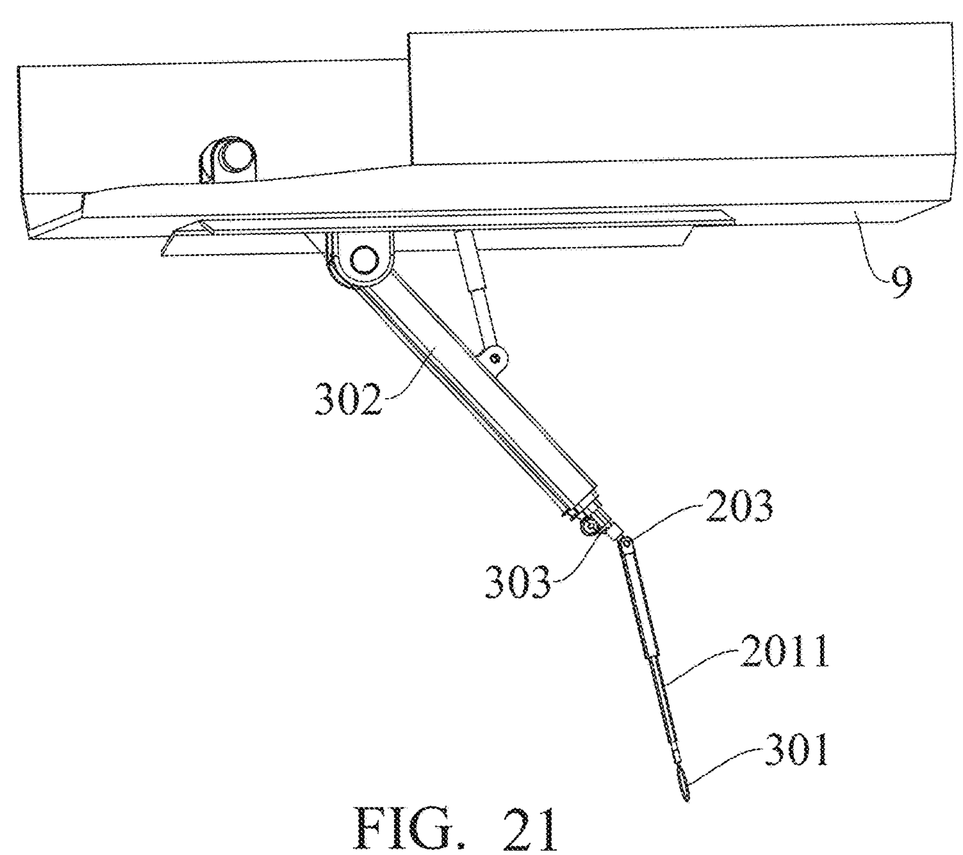
FIG. 21 is a perspective view of Embodiment 2.4 according to one aspect of the present disclosure.

Embodiment 2.4, referring to FIG. 21, is based on Embodiment 2.1. A fixed end of the RRP-type mechanical arm 2011 is mounted on the last section of the guiding rod 302, and a free end of the mechanical arm 2011 is fixedly connected to the docking device 301. A first R-axis of the mechanical arm 2011 is parallel to the length direction of the guiding rod 302, and a second R-axis is perpendicular to the first R-axis. In combination of P kinematic pair, the docking device 301 is driven to a designated position in a three-dimensional space. The end of the guiding cable 303 is transferred from the docking device 301 to the fixed end of the mechanical arm 2011. In the present embodiment, load isolation is achieved by a torque-limiting coupling 203. After the aircraft 1 docks and locks with the docking device 301, the docking device 301 drives the mechanical arm 2011 to move, and the torque-limiting coupling 203 prevents the servo drive from an impact load caused by the aircraft 1. The mechanical arm 2011 enters a passive working state. Ideally, the lever of the mechanical arm 2011 can be understood as a "two-force rod", with a function similar to the guiding cable 303 in Embodiment 2.1 and Embodiment 2.2. In the case of the currently used mechanical arm 2011, the strength of the lever of the mechanical arm 2011 being pulled depends on the strength of its material, which is typically much greater than the drive capacity of the servo mechanism of the mechanical arm 2011. Therefore, under the effect of load isolation, the mechanical arm 2011, which has a servo drive with a low load capacity but high dynamic capability and precision, can still be employed to directly dock with the aircraft 1 for capture and recovery.

Figure 22:
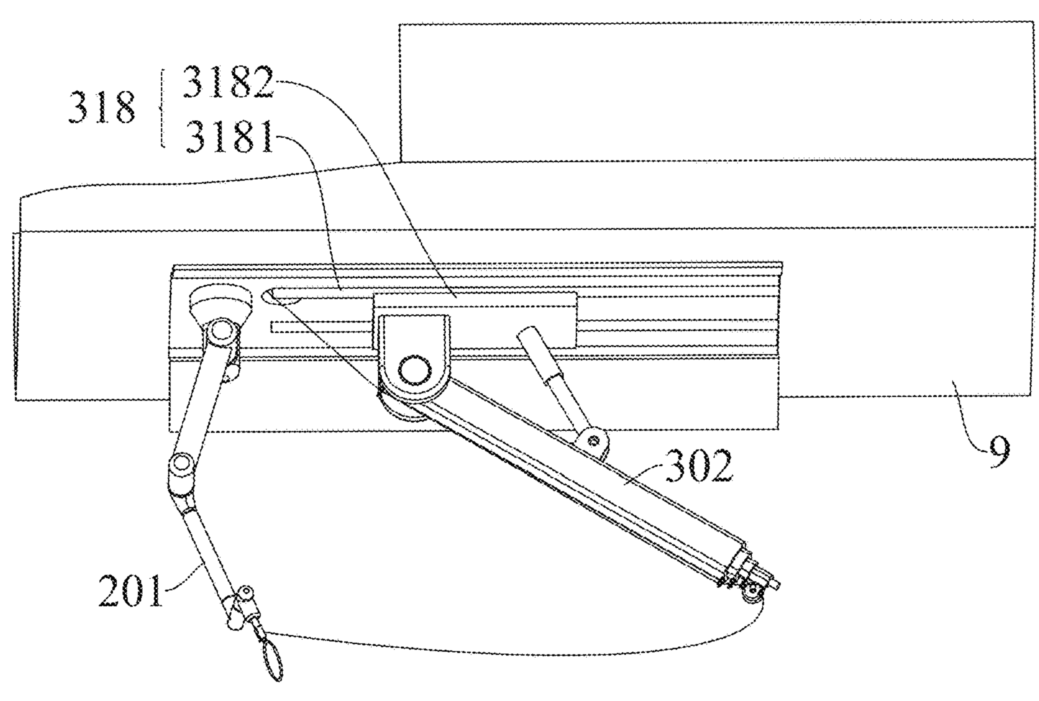
FIG. 22 is a perspective view of Embodiment 2.5 according to one aspect of the present disclosure.

Embodiment 2.5, referring to FIG. 22, is based on Embodiment 2.1. The guiding device is implemented using a mobile device 318 and the guiding rod 302 installed on the mobile device 318. The mobile device 318 and the guiding rod 302 are used to guide and buffer the aircraft 1. In some embodiments, the mobile device 318 includes a guide rail 3181 and a slide seat 3182 arranged on the guide rail in a sliding manner. The guide rail 3181 is mounted on a base of the carrier aircraft, and the guiding rod 302 is fixedly arranged on the slide seat 3182. The advantage of the present embodiment lies in that the slide seat 3182 is controlled to move the guiding rod 302 to a suitable position. For example, the guiding rod 302 moves backward or raise forward, allowing the recovered aircraft 1 to move into aircraft's cabin and into the operational space of the mechanical arm 201 of the high-dynamic precise docking subsystem. The acting force between the slide seat 3182 and the guide rail 3181 provides buffering for the recovery of the aircraft 1, and the guiding rod 302 completes the subsequent storage operation. The guiding device in the present embodiment is a combination of the guiding rod 302 and the mobile device 314.

Embodiment 2.6, based on Embodiment 2.6, the mechanical arm or the guiding rod and the mechanical arm thereon in Embodiments 2.1, 2.2, 2.3, and 2.4 is mounted on the mobile device in Embodiment 2.5 to achieve a more flexible implementation solution.

The embodiments mentioned above are designed for docking with the aircraft as the target, and implementations for docking with items as targets are similar to those with aircraft as the targets. For example, along the route of the carrier aircraft equipped with this docking system, cargo can be transferred by a feeder aircraft onto the carrier aircraft.

Figure 23:
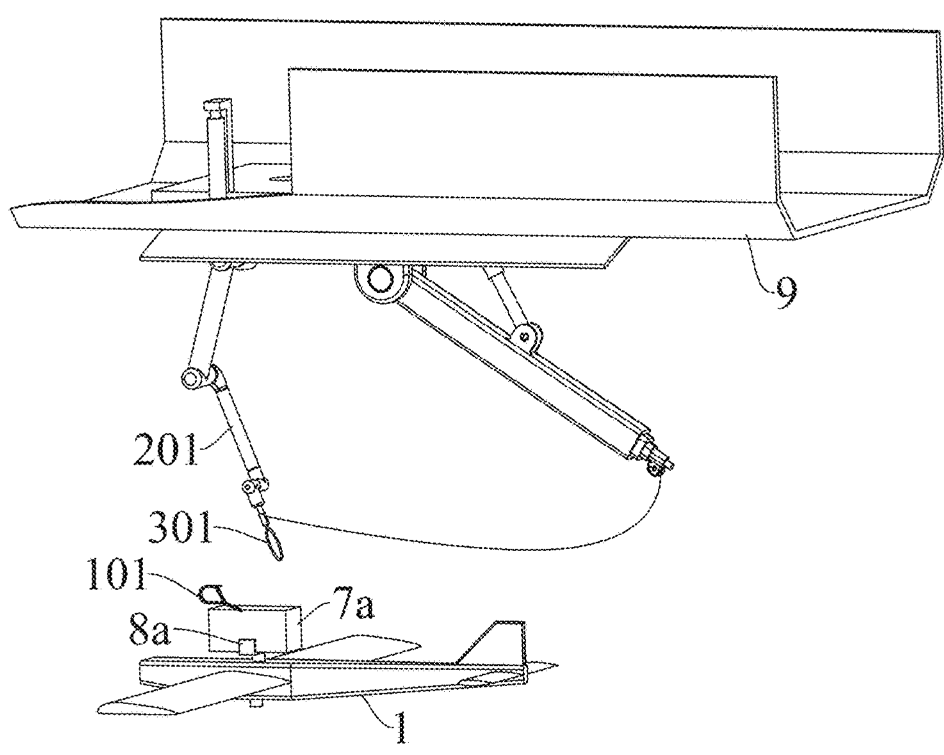
FIG. 23 is a perspective view of aerial cargo recovery according to one aspect of the present disclosure.

In some embodiments, as shown in FIG. 23, the aircraft 1 is provided with a controllable clamping device **8*a* to clamp a cargo 7 and release it from the aircraft 1 under certain conditions. The aircraft-side docking device 101 in Embodiment 2.1 is mounted on a cargo 7*a*. When the aircraft 1 drives the cargo 7*a* to pass by the carrier aircraft, the mechanical arm 201 drives the docking device 301 to dock with a docking device on the cargo 7*a*. The docking action triggers the clamping device 8*a* on the aircraft 1 to release the cargo, and the cargo 7*a* detaches from the aircraft 1. The subsequent recovery procedure of the cargo 7*a* is similar to that of the aircraft 1, and is not elaborated here. At this point, the docking and transfer of the cargo 7*a*** in the air is completed.

Figure 24:
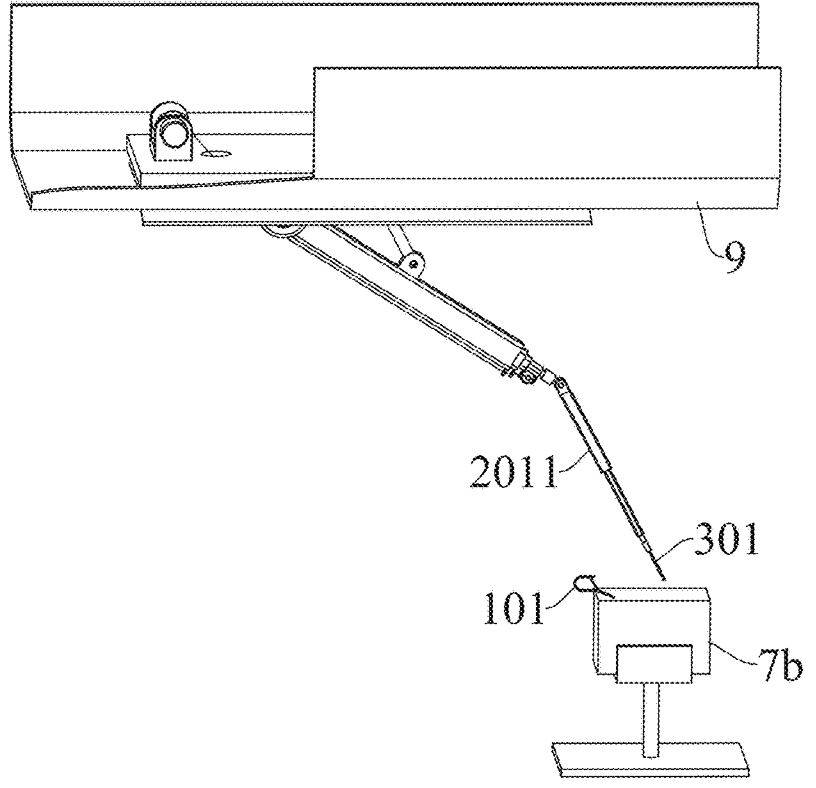
FIG. 24 is a perspective view of ground cargo recovery according to one aspect of the present disclosure.

In some embodiments, as shown in FIG. 24, the carrier aircraft using this system can dock with and recover the cargo **7*b*** placed on the ground. The principle is similar to that in the previous embodiment, and details are not described here.

Although the embodiments of the present disclosure have been shown and described, those of ordinary skill in the art may appreciate that various changes, modifications, substitutions, and variations can be made to these embodiments without departing from the principle and spirit of the present disclosure, and the scope of the present disclosure is defined by the appended claims and their equivalents.

What is claimed is:

1. A differential-speed target precise docking and recovery system, comprising:

a braking and guiding system configured to reduce target energy, and the braking and guiding system comprising a braking device and a docking device connected to the braking device;

a docking arm configured to drive the docking device to dock with a target;

a control system configured to acquire state/states information of the docking arm and the target and to control the docking arm to adjust a pose according to the state/states information to capture the target; and an impact load isolation means configured to:

substantially isolate a drive device of the docking arm from a load imposed by the target and direct the load to the braking and guiding system after the docking device docks with the target.

2. The system according to claim 1, wherein:

the braking and guiding system is further configured to impose constraints on a motion of the target.

3. The system according to claim 1, wherein:

a free end of the docking arm is provided with a retaining member;

the braking and guiding system comprises a first cable, the docking device is connected to the braking device via the first cable;

the impact load isolation means is configured to:

enable the docking arm to drive the docking device to dock with the target through the retaining member; and enable the retaining member to maintain a fixed connection between the docking device and the docking arm before the docking device docks with the target; and release the docking device from the retaining member after the docking device docks with the target, such that the load imposed by the target is transferred to the braking device through the docking device and the first cable, rather than being borne by the drive device of the docking arm.

4. The system according to claim 1, wherein:

the impact load isolation means comprises a load isolation device between a servo drive device and a driven portion of the docking arm;

the load isolation device is configured to:

maintain a sufficient high-dynamic and high-precision motion capability of the docking arm before the docking device docks with the target to ensure reliable docking between the docking device and the target; and decouple torque transmission between the servo drive device and the driven portion after the docking device docks with the target, such that the driven portion is passively tensioned by the load imposed by the target and transmits the load to the braking device, while the servo drive device is substantially isolated from the load.

5. The system according to claim 4, wherein:

the docking device is disposed at a free end of the docking arm, and a fixed end of the docking arm is disposed on the braking device.

6. The system according to claim 1, wherein:

the braking device comprises at least one of a telescopic mechanism, a mobile platform, and a winch.

7. The system according to claim 6, wherein:

the telescopic mechanism is provided with a first drive device configured to control a telescopic state of the telescopic mechanism.

8. The system according to claim 6, wherein:

a fixed end of the telescopic mechanism is disposed on a carrier at a fixed pitch angle.

9. The system according to claim 6, wherein:

a fixed end of the telescopic mechanism is connected to a carrier through a revolute joint, and the telescopic mechanism is provided with a second drive device configured to adjust an angle between the telescopic mechanism and the carrier.

10. The system according to claim 9, wherein:

the second drive device comprises:

a limiter disposed between the telescopic mechanism and the carrier, or a rotating mechanism disposed on the revolute joint.

11. The system according to claim 6, wherein:

a movable end of the telescopic mechanism is provided with a cable adjuster, the first cable is connected to the movable end of the telescopic mechanism by the cable adjuster; and the cable adjuster is configured to adjust an extension length of the first cable or a running speed of the first cable.

12. The system according to claim 6, wherein:

the braking device comprises a telescopic mechanism, a winch, and a second cable; a first end of the second cable is connected to the winch, and a second end is connected to a movable end of the telescopic mechanism.

13. The system according to claim 1, wherein:

the braking device and/or the guiding arm is rotatable about their respective axes or a common axis.

14. The system according to claim 1, wherein:

the braking device and/or the guiding arm is translatable in a horizontal direction.

15. A differential-speed target precise docking and recovery system, comprising:

a braking device configured to reduce target energy and provided with a docking device;

a docking arm configured to drive the docking device to dock with a target; and an impact load isolation means configured to:

enable the docking device to detach from the docking arm under impact in response to the docking device docking with the target, allowing a load from the target imposed on the docking arm to be transferred to the braking device; and substantially isolate a drive device of the docking arm from the load imposed by the target.

16. The system according to claim 15, wherein:

the braking device comprises a first cable;

the docking device is connected to the braking device via the first cable;

the impact load isolation means is configured to:

enable the docking arm to drive the docking device to dock with the target through the retaining member; and release the docking device from the retaining member after the docking device docks with the target, such that the load imposed by the target is transferred to the braking device through the docking device and the first cable, rather than being borne by the drive device of the docking arm.

17. The system according to claim 15, wherein the braking device and the docking arm are separated from each other and respectively disposed on at least one carrier.

18. A differential-speed target precise docking and recovery system, comprising:

a braking device configured to reduce an energy of a target, a docking arm configured to drive the docking device to dock with the target, and an impact load isolation means configured to substantially isolate a drive device of the docking arm from a load imposed by the target and direct the load to the braking and guiding system after the docking device docks with the target;

wherein an end of the docking arm is connected to a movable end of the braking device, a free end of the docking arm is provided with a docking device.

19. The system according to claim 18, wherein the impact load isolation means comprises a load isolation device between a servo drive device and a driven portion of the docking arm;

the load isolation device is configured to:

maintain a sufficient high-dynamic and high-precision motion capability of the docking arm before the docking device docks with the target to ensure reliable docking between the docking device and the target; and decouple a load transmission between the servo drive device and the driven portion after the docking device docks with the target, such that the driven portion is passively tensioned by the load imposed by the target and transmits the load to the braking device, while the servo drive device is substantially isolated from the load.

20. The system according to claim 18, wherein the end of the docking arm is connected to the movable end of the braking device through a torque-limiting coupling.

* * * * *